Figure 1:
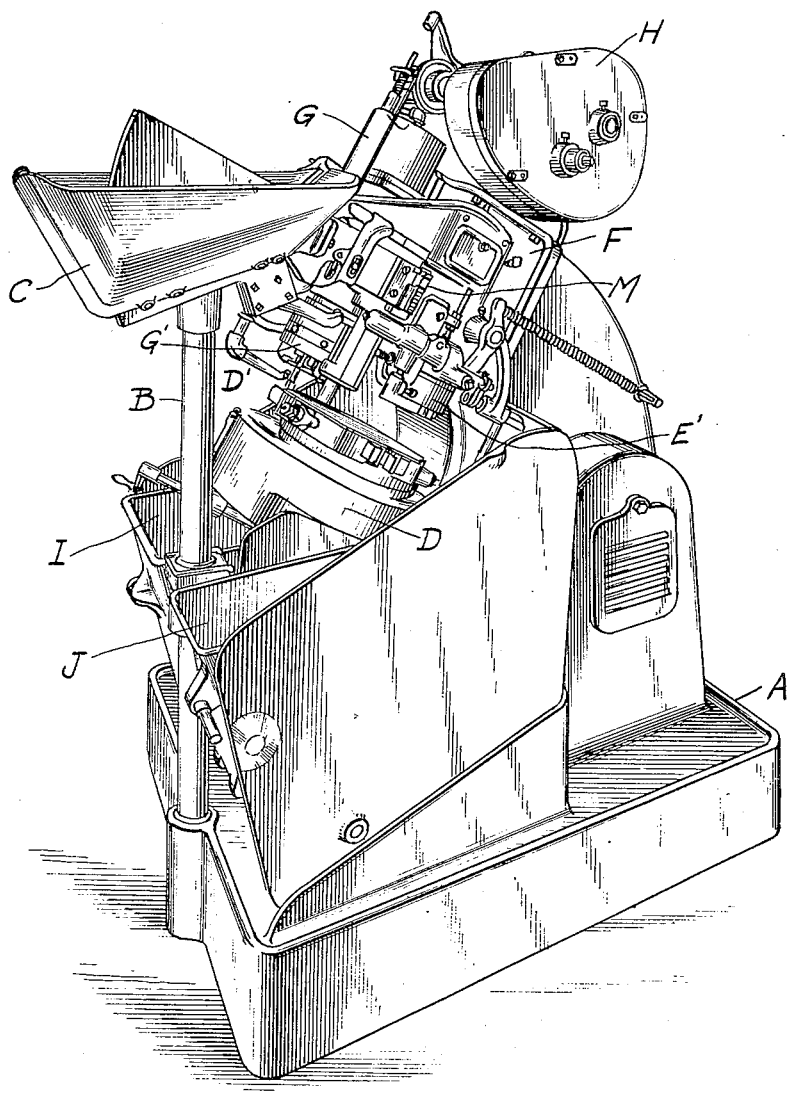

Inventor
SAMUEL.W.MATHIAS.

By
Attorney

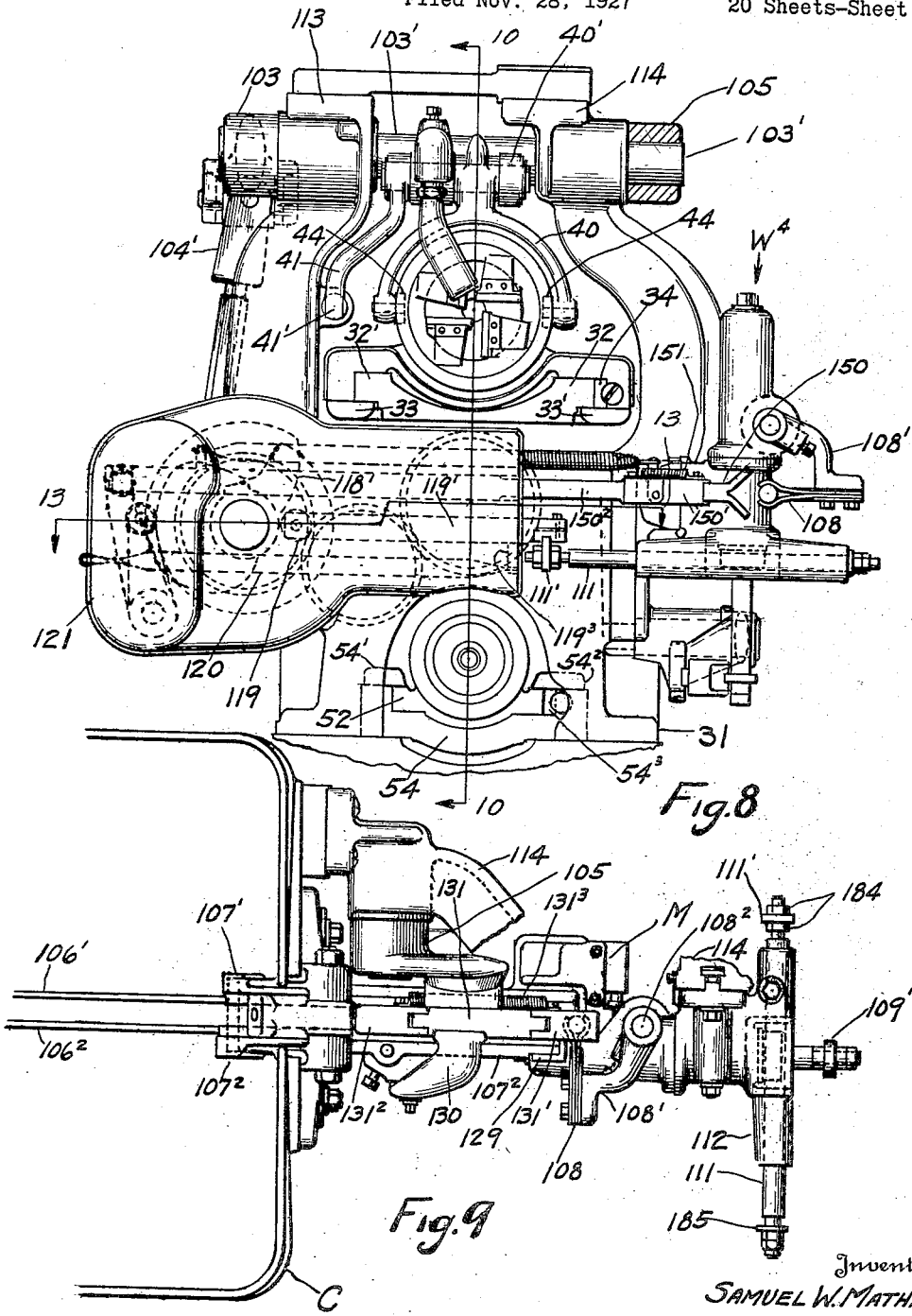

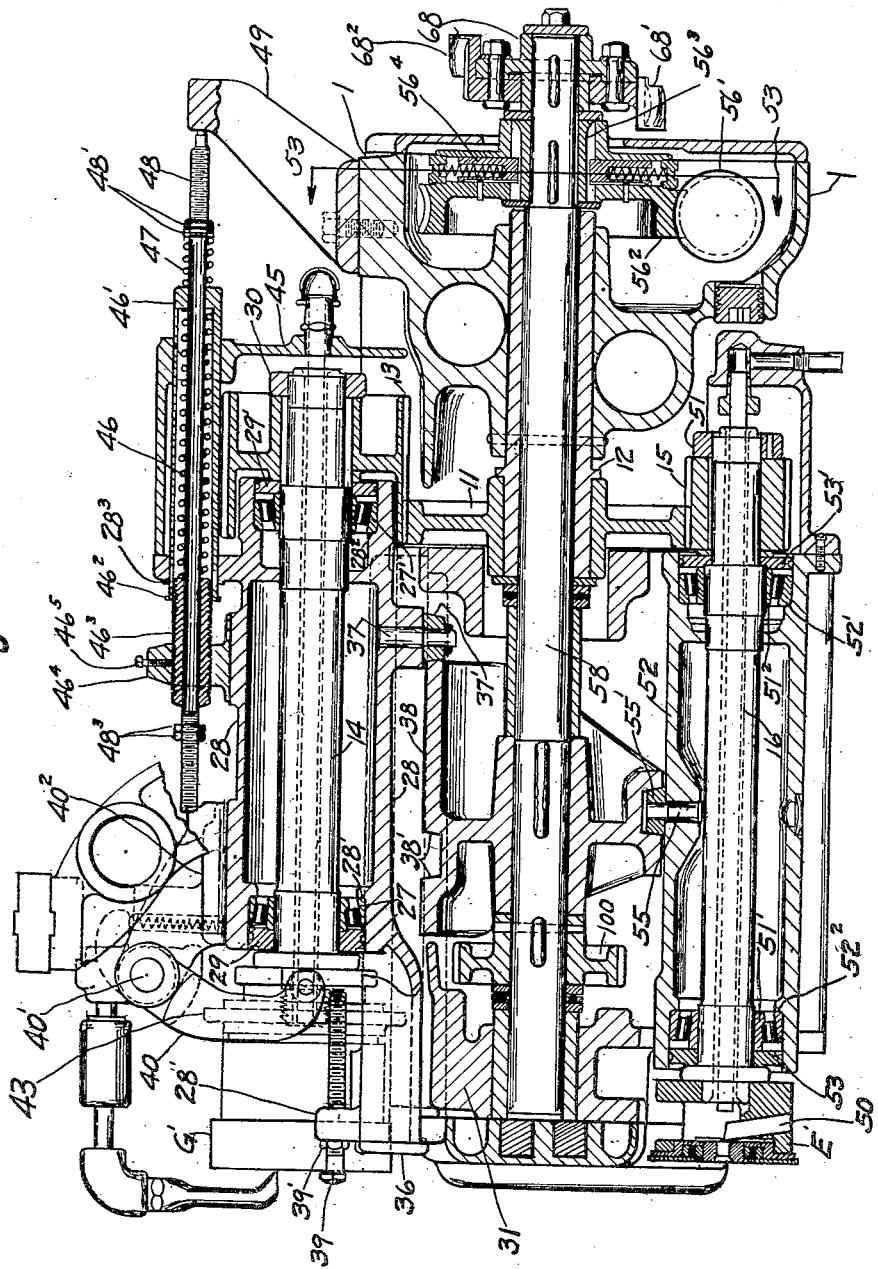

Inventor
SAMUEL W. MATHIAS.
By
Attorney

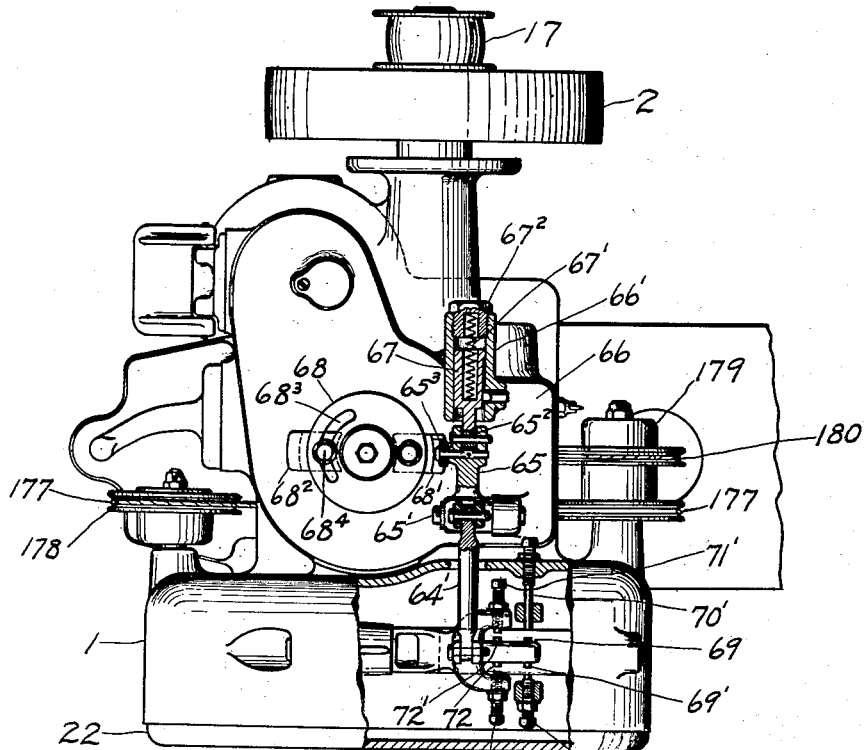
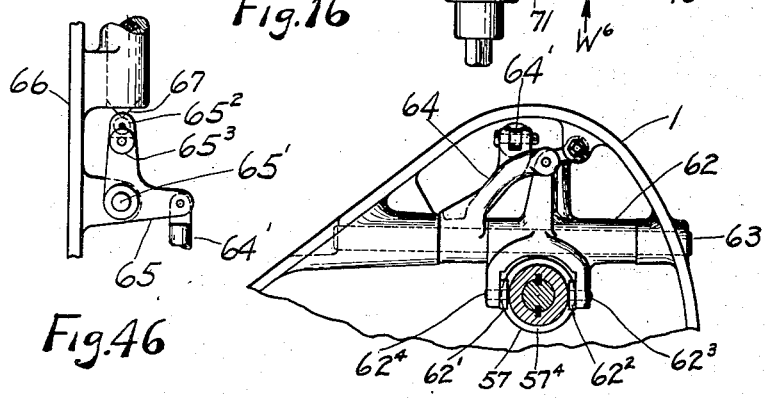

May 30, 1933.  S. W. MATHIAS  1,912,211
FORMING AND THREADING MACHINE
Filed Nov. 28, 1927  20 Sheets-Sheet 13

Inventor
SAMUEL W. MATHIAS.
By Œ. Bradford
Attorney

May 30, 1933. S. W. MATHIAS 1,912,211
FORMING AND THREADING MACHINE
Filed Nov. 28, 1927  20 Sheets-Sheet 14

Inventor
SAMUEL W. MATHIAS.

By

Attorney

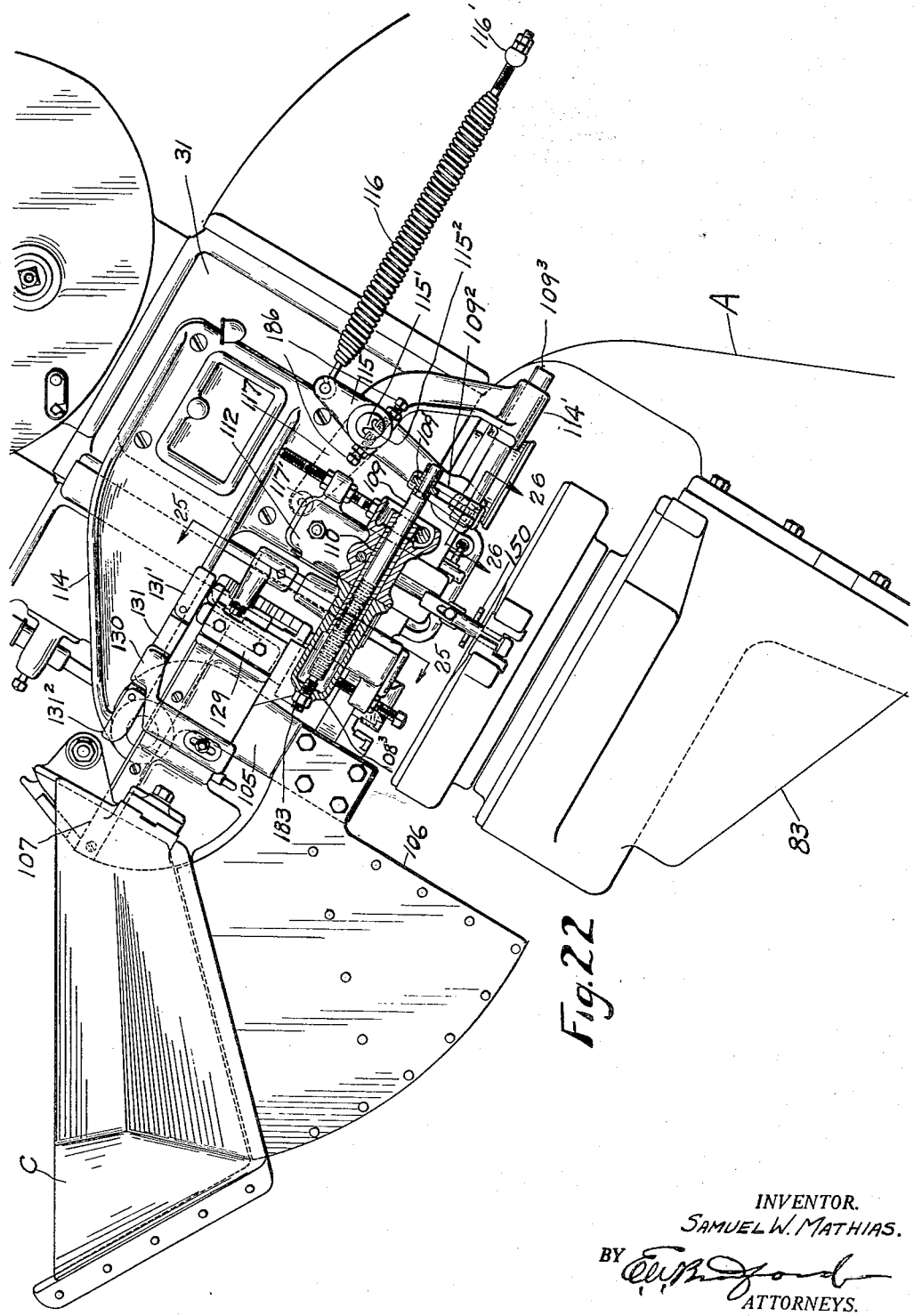

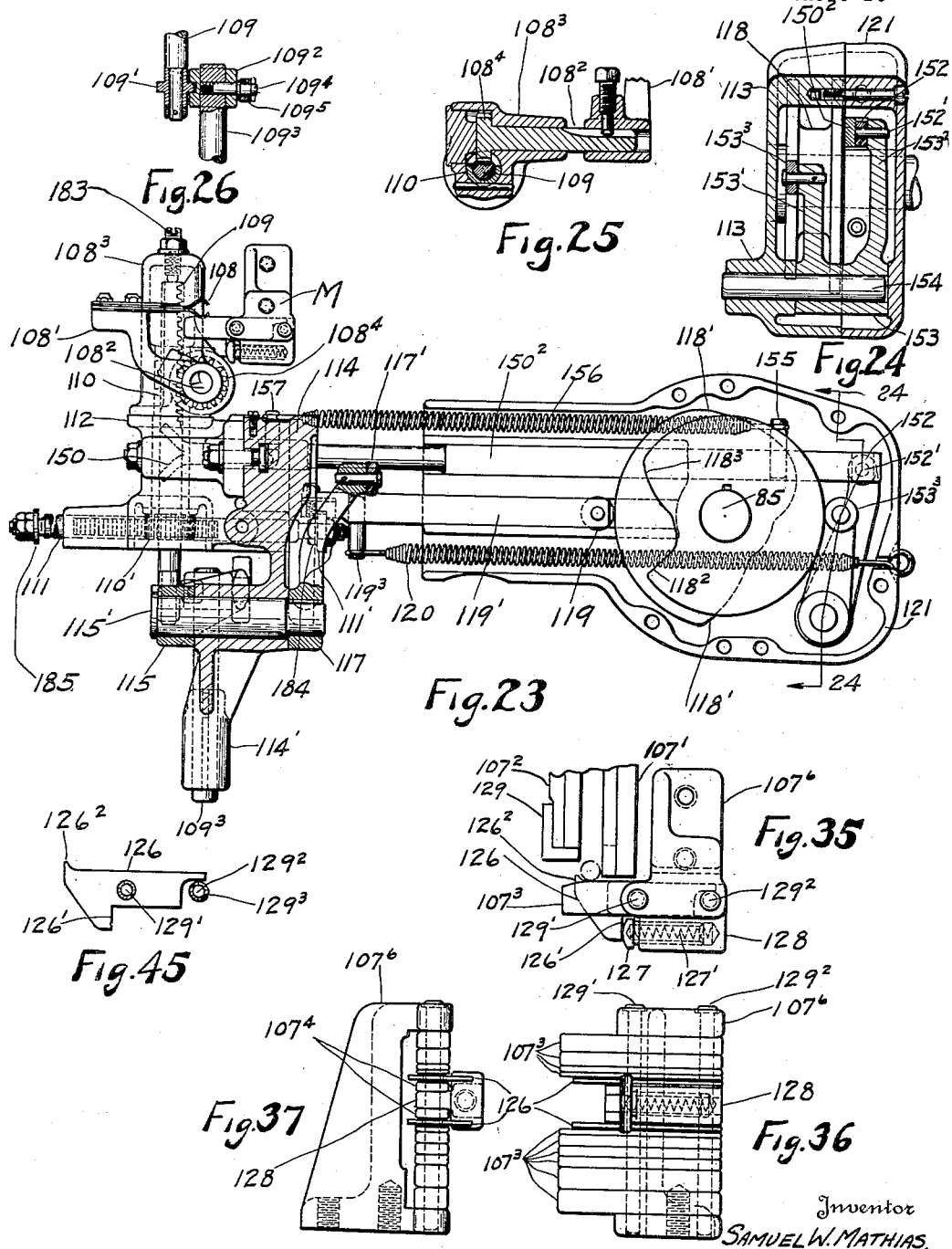

May 30, 1933.  S. W. MATHIAS  1,912,211
FORMING AND THREADING MACHINE
Filed Nov. 28, 1927  20 Sheets-Sheet 18
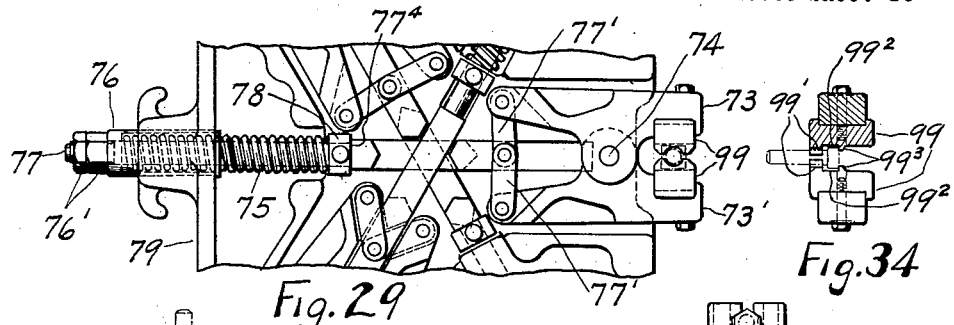
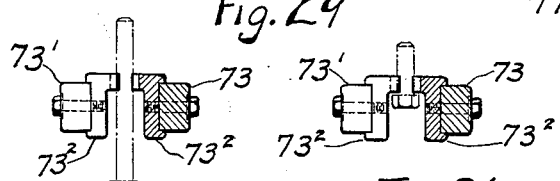
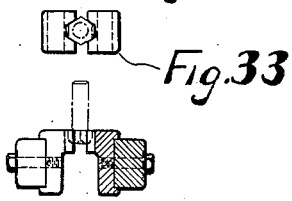
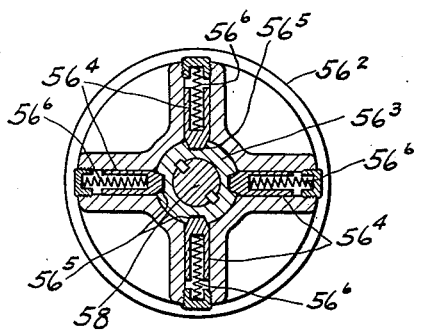
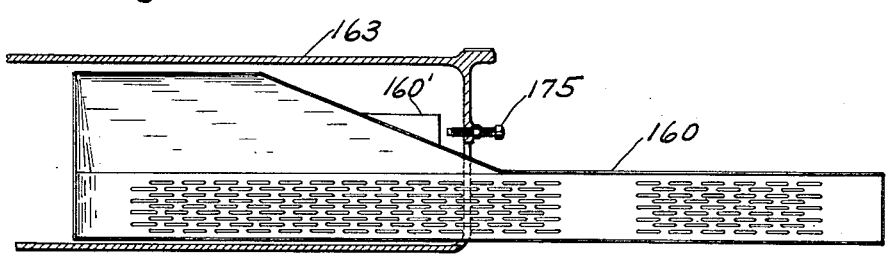
Inventor
SAMUEL W. MATHIAS.
By
Attorney

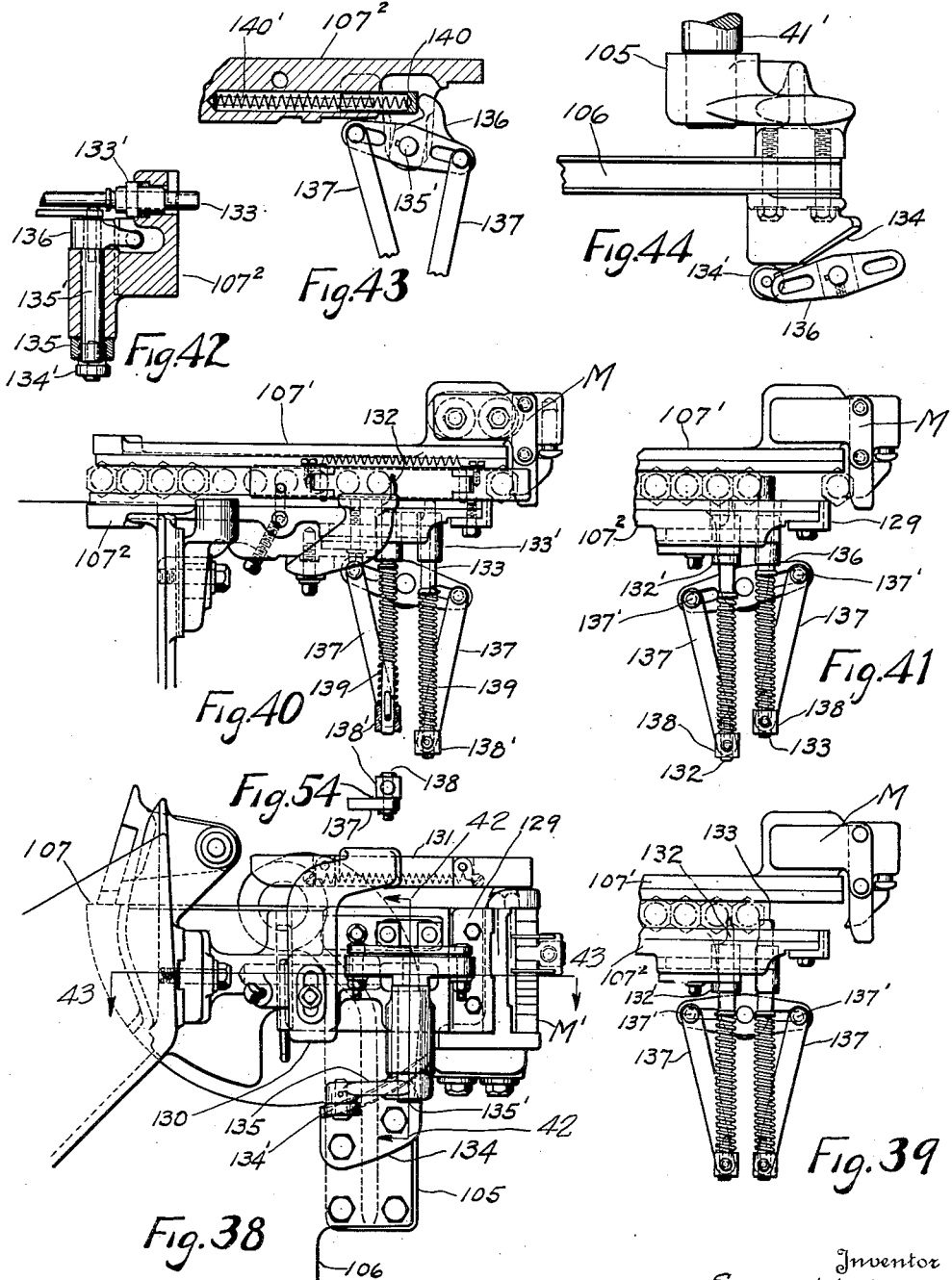

May 30, 1933.　　S. W. MATHIAS　　1,912,211
FORMING AND THREADING MACHINE
Filed Nov. 28, 1927　　20 Sheets-Sheet 20
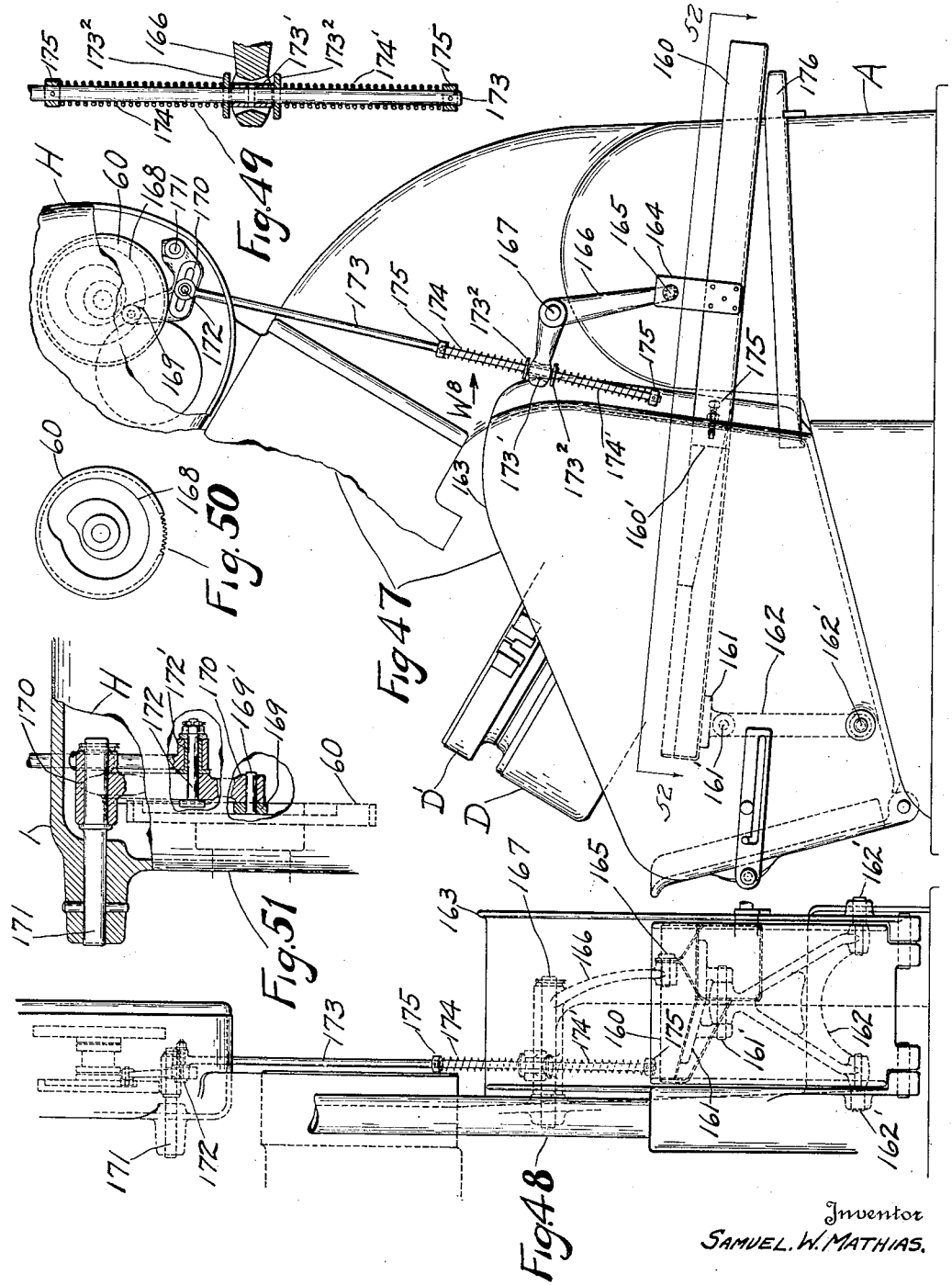
Inventor
SAMUEL. W. MATHIAS.
By
Attorney Patented May 30, 1933

1,912,211

UNITED STATES PATENT OFFICE

SAMUEL W. MATHIAS, OF WAYNESBORO, PENNSYLVANIA, ASSIGNOR TO LANDIS MACHINE COMPANY, OF WAYNESBORO, PENNSYLVANIA, A CORPORATION

FORMING AND THREADING MACHINE

Application filed November 28, 1927. Serial No. 236,258.

My invention relates to a machine for forming and threading parts wherein the main contour has been formed, as by casting, drop forging, cold upsetting, hot forging or formed on turning machines, etc. Such work normally includes blank bolts or screws and parts requiring a threading operation or requiring a threading and forming operation. The threading operation consists of cutting screw threads on the pieces. The forming operation consists of rounding, chamfering or forming the ends of the pieces and at the same time determining their lengths, the forming or chamfering tools traveling in line with the axis of the piece. One of the principal usages to which this machine can be put is that of automatically pointing and threading bolts and screws.

The objects of my invention are to secure a machine to perform the above functions wherein is disclosed:

New and improved means for safe guarding all moving parts.

New and improved means for starting the die head on the work.

New and improved means for opening the die head when the correct length of thread is cut.

New and improved means for mounting, driving and controlling the threading die head.

New and improved means for mounting, driving and controlling the forming head.

New and improved means for securing uniform length to the pieces or work through a combination of the means for gripping the pieces or work and the travel of the forming head or through the combination of means for transferring the pieces or work and the travel of the forming head.

New and improved means for transferring the work or pieces from the feeding chute to the chucking members.

A new and improved chuck.

New and improved turret indexing means.

New and improved means for positioning the pieces in the chucks.

New and improved means for gripping long pieces of work near the portion to be threaded without loss of gripping pressure.

New and improved means for gripping the work regardless of variations in diameter.

New and improved means for ejecting the work from the chucks and for conveying the work away from the machine.

Means whereby the chuck, indexing member and component parts are contained in one unit and all adjustable in relation to the die head and the forming head.

Means whereby the moving parts are accelerated during a portion of the cycle of operation.

Means whereby a constant time is required for returning the threading head, the forming head and the indexing of the chuck turret regardless of the speed of the threading head and forming head.

Improved means for maintaining the synchronism of the synchronized parts.

Means for combining a positive clutch and a shock absorbing device.

Means whereby the length of threads cut one to another can be held to much closer limits than on machines of the above character heretofore disclosed.

Means whereby the setting up time is much less than in machines of the above character heretofore disclosed.

Means whereby the threading die head and the forming head are movable in a semi-vertical line of travel and at a right angle to the feeding chute.

This machine is a unitary structure built up of co-operative elements so as to provide an automatic machine capable of feeding the work of the machine, forming the ends of the work and cutting screw threads thereon and ejecting the work. Also if desired to provide means for conveying the finished work to a suitable receptacle.

The machine is designed with a view, first, of producing accurate work, second, of turning out the work more rapidly than is possible with known machines and third, to perform these operations with the utmost efficiency. In carrying out these objects accurate work is secured by the use in the machine of an improved die head using end sharpened tangential chasers or cutters. Increased production over known machines is gained by speeding up certain of the operations during certain stages in the cycle of operation.

The machine consists of a base adapted to contain a body of oil which is circulated by a suitable force feed pump to cool the forming tool and the threading cutters. Made integral with the base and at the rear end is a large upright standard. The lower part of this standard is preferably provided with a chamber for housing a driving motor for operating the machine. The upright standard at its upper end curves toward the front and has a face or surface to which is bolted a base provided with slideways. Suitable sliders are mounted to slide in the slideways. One of these sliders carries a forming head and the other carries a threading head.

The lower part of the standard has a similar face in a plane alined with the upper face. This lower face is provided with guideways for a chucking and turret indexing mechanism which permit vertical adjustment of said chucking and turret indexing mechanism. A post near the front of the base provides a support for a supply hopper into which a supply of blank bolts or other work is put prior to beginning the operations. A suitable feeding device moves vertically through this hopper and as it so moves the bolts or work drop into it and enter a slot so that they are caught by the head. The feeding device is positioned in its upward position so that the upper edge aligns with a chute placed at an angle, sufficient to allow the bolts or work to slide down into the chute and stop against a stop without providing too great pressure against them due to their weight. Since the bolts or work will stop at an angle perpendicular to the chute and since this is the axial direction in which they will be positioned in the chuck turret, the threading and forming heads move in a line parallel to the axis of the bolts or work. To provide for this the faces or surfaces on the rear standard above mentioned are at an angle to correspond to the direction at which the bolts or work rest at the end of the chute.

This machine is designed for performing the several necessary steps in feeding bolts or work to the machine, forming and pointing the end of the bolts or work and cutting screw threads on the work and to carry out these operations simultaneously. The mechanism for doing this is as follows: A transfer arm or feeding arm has certain necessary movements by which it selects a bolt or work from the chute and delivers it to a chuck in an indexing turret. The turret then moves to position the bolt or work beneath the forming or pointing tool. The forming head moves to cut the bolt or work to proper length and shape the end, and at the same time the transfer device selects another piece from the chute and positions it in a chuck as before.

The forming and pointing head is operated by a shaft mounted in a carriage which moves vertically in the slide fixed upon the plane or surface of the standard previously mentioned. The slide does not move directly vertically but for convenience it will be described as a vertical movement. The shaft carrying the forming and pointing head is rotated by suitable gearing mounted in a driving unit. The forming head is designed so as to give the end of the bolt or work any desired form. When the end has been formed and after the withdrawal of the forming head the chucking and turret indexing mechanism is moved by suitable mechanism which comes into play automatically to position the bolt or work beneath the threading die head. Another blank piece is brought into position beneath the forming head and another piece is selected from the chute by the transfer mechanism and placed in a chuck in the indexing turret. The threading operation now takes place.

The threading die head is secured upon a shaft mounted in a sliding member. This shaft is rotated by suitable gearing mounted in the driving unit. The threading die head is moved into position against the end of the bolt or work. When the thread has been cut for a predetermined distance suitable stop mechanism prevents further advance of the carriage carrying the threading die head. With a continued rotation of the threading die head and with the threads exercising a pulling upon the head the head is caused to separate and to open the chasers or cutters.

As the threading die head opens to move the chasers or cutters to the non-cutting position a rotating cam moves the threading die head along with the forming head vertically away from the chucking and turret indexing mechanism, whereupon the turret moves to position the finished piece in the position where it was first put into the chuck in the indexing turret. Just as it reaches this position a suitable device causes the chuck to open and a kicker or ejector removes the piece just in advance of the movement of the transfer device which positions another piece in the chuck.

The above three operations have been described as if they operated in sequence. As a matter of fact, all three are moving together; that is, the transfer mechanism or feeding arm, the forming operation and the threading operation all take place together, one at each chuck in the indexing turret.

The carriage which supports and carries the threading mechanism is counter-balanced by means of a cable passing over a pulley; to the other end of the cable balancing weights are attached. The movement of the forming head carriage to and from its positions in relation to the chuck turret is secured by a cam mounted in the cam unit. The threading die head carriage is operated in its movement toward the chuck turret by a combination of a cam, a starting spring and the lead nut formed by the thread cutting chasers, its movement away from the chuck turret being secured by a cam. The cams referred to are mounted in the cam unit and make one revolution per cycle of operation.

Within the chucking and turret indexing mechanism are arranged gears and cams that move in timed relation with the vertical movements of the forming head and the threading die head so as to index the turret, operate the jaws of the chucks and lock the turret in place. This mechanism may be vertically adjusted by suitable manually operated means to position the turret for work of different length. The transfer device or feeding arm which places the work in the chucks is also adjustable and may be set with precision.

After the threading operation is completed the cam shaft is speeded up automatically for the withdrawal of the forming and threading heads and the indexing of the turret. This lessens what would otherwise be a long idling time and consequently greatly increases production.

Separate compartments to receive the cuttings and the finished work are attached to the base of the machine. The compartment for cuttings is located under the threading and forming heads. The compartment for finished work is located under the loading and unloading station of the chuck turret. In this compartment, when desired, is located a conveyor for carrying the finished work away from the machine.

Figure 2:
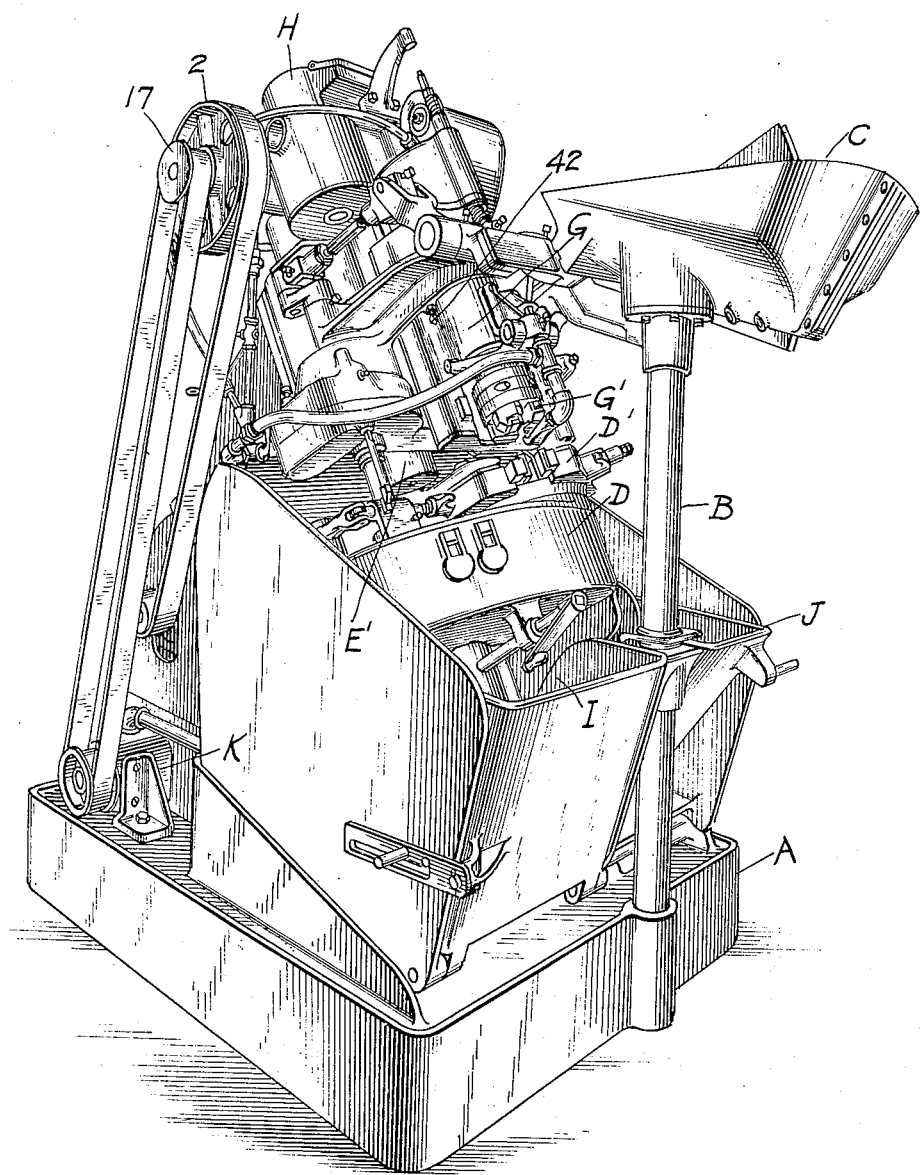
Figure 3:
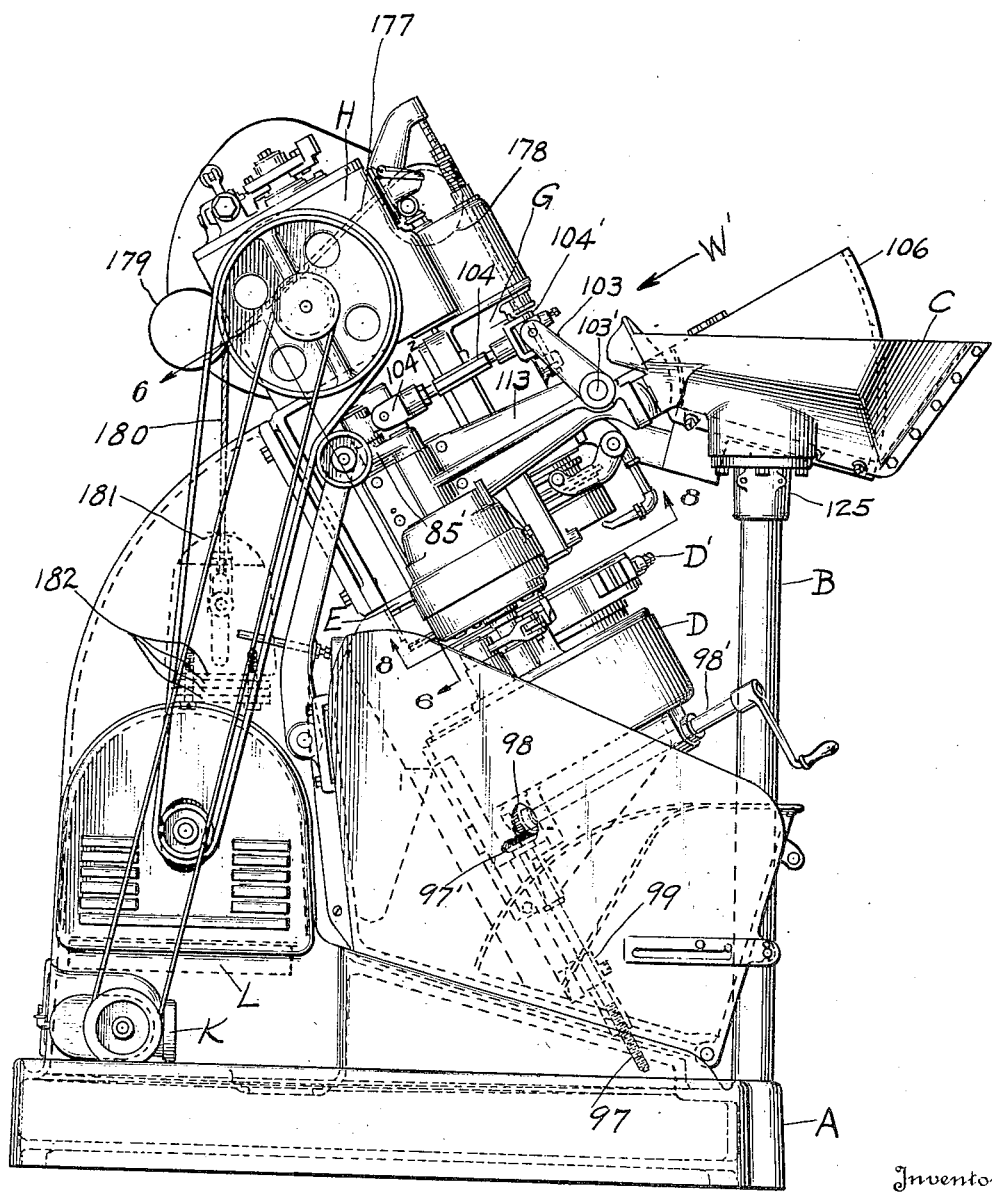
Figure 4:
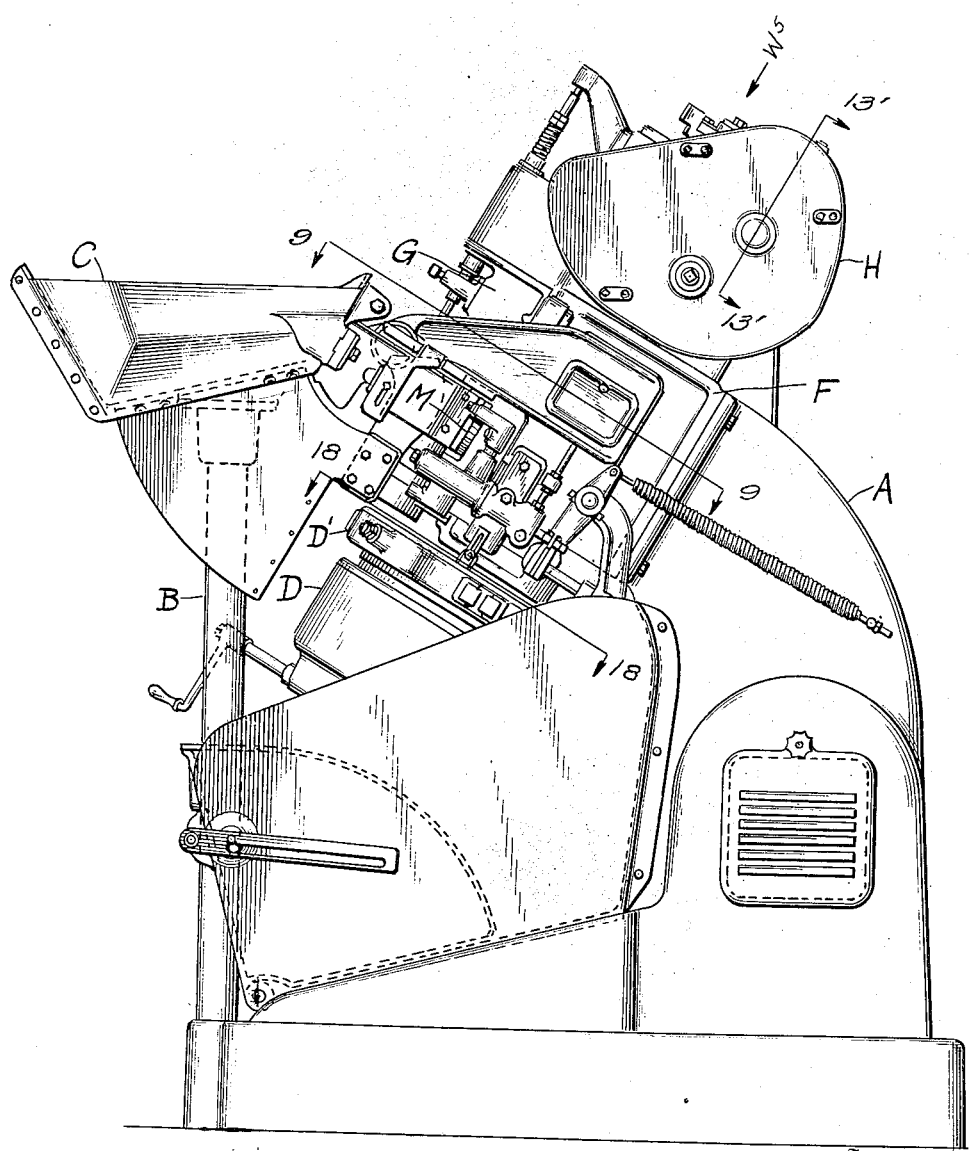
Figure 5:
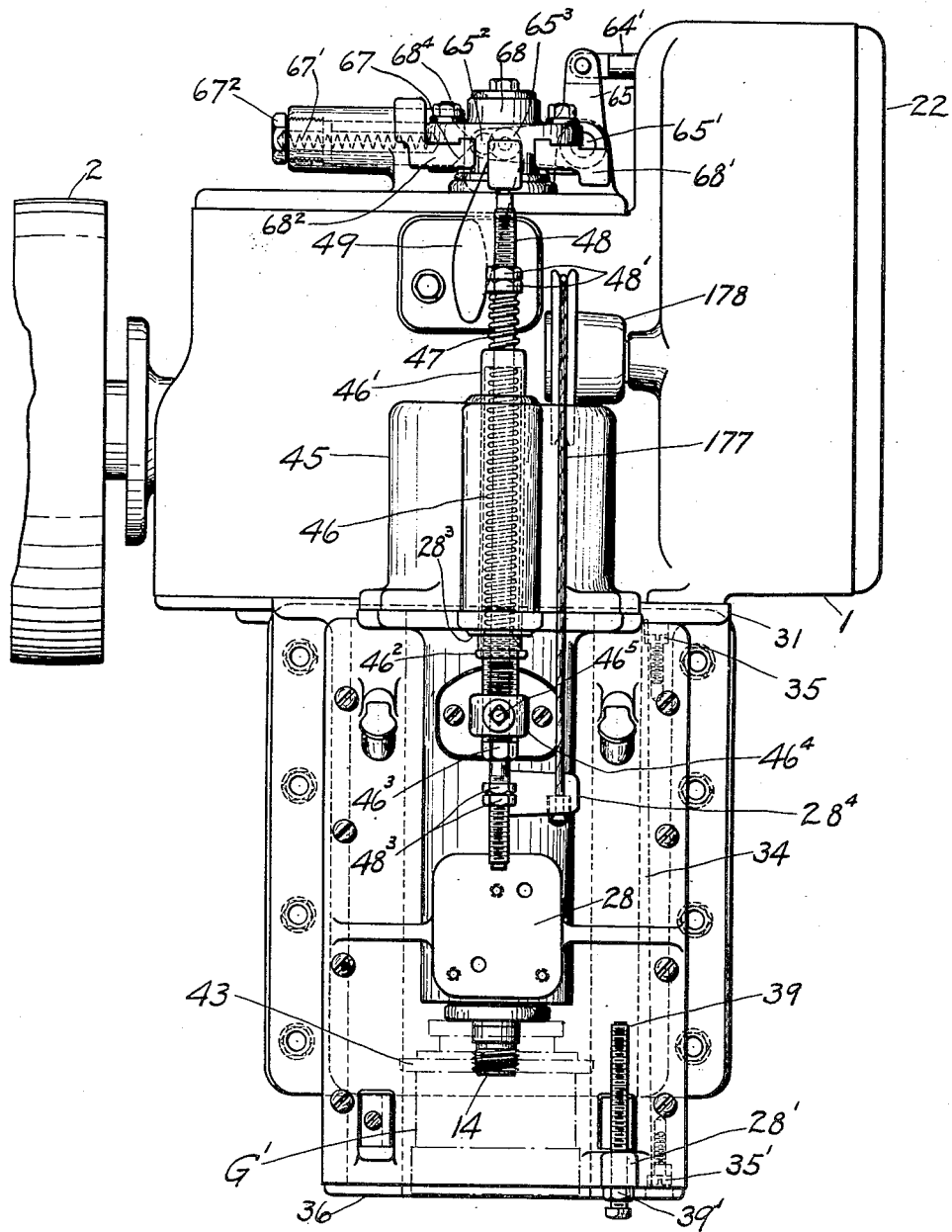
Figure 6:
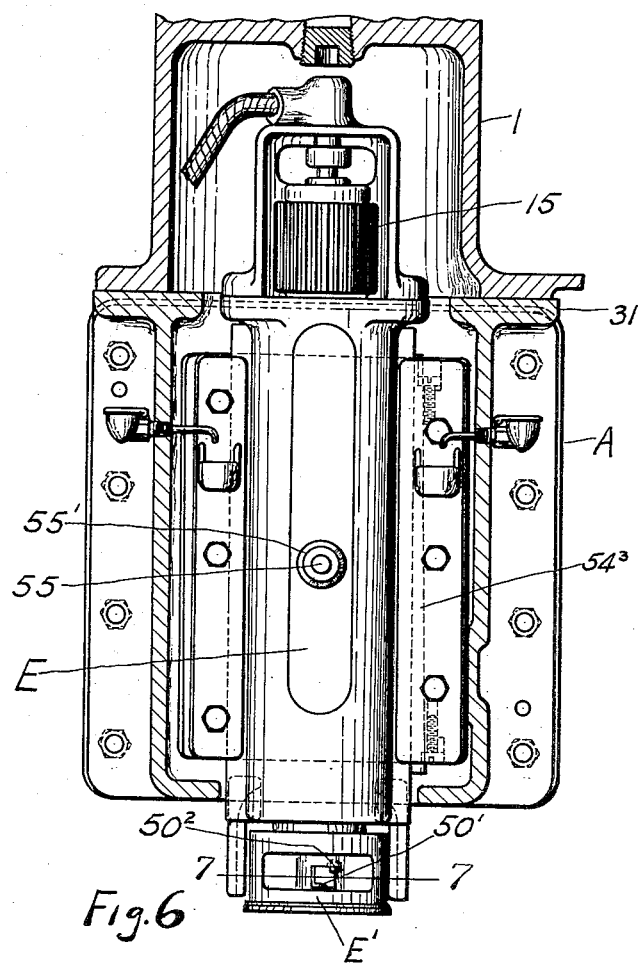
Figure 7:
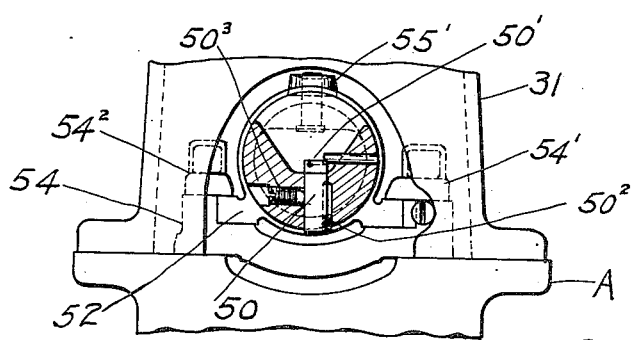
Figure 11:
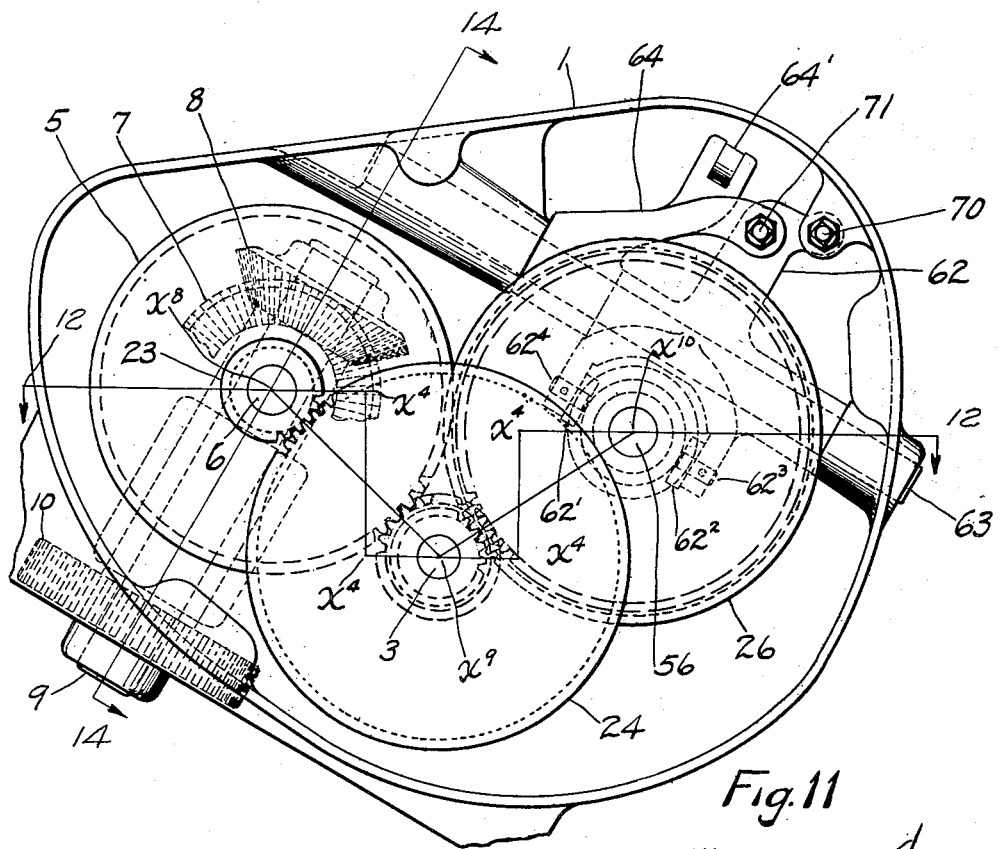
Figure 12:
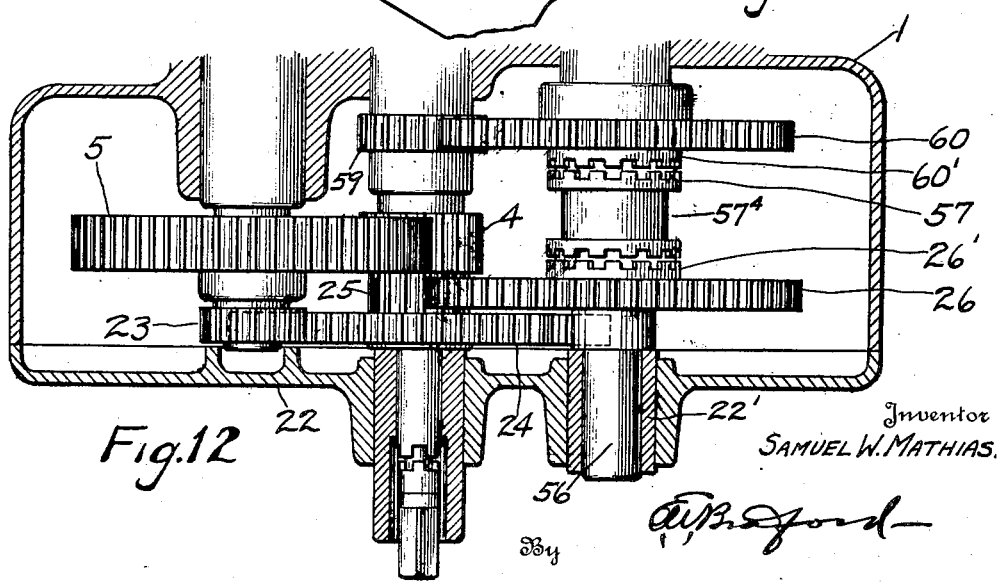
Figure 13:
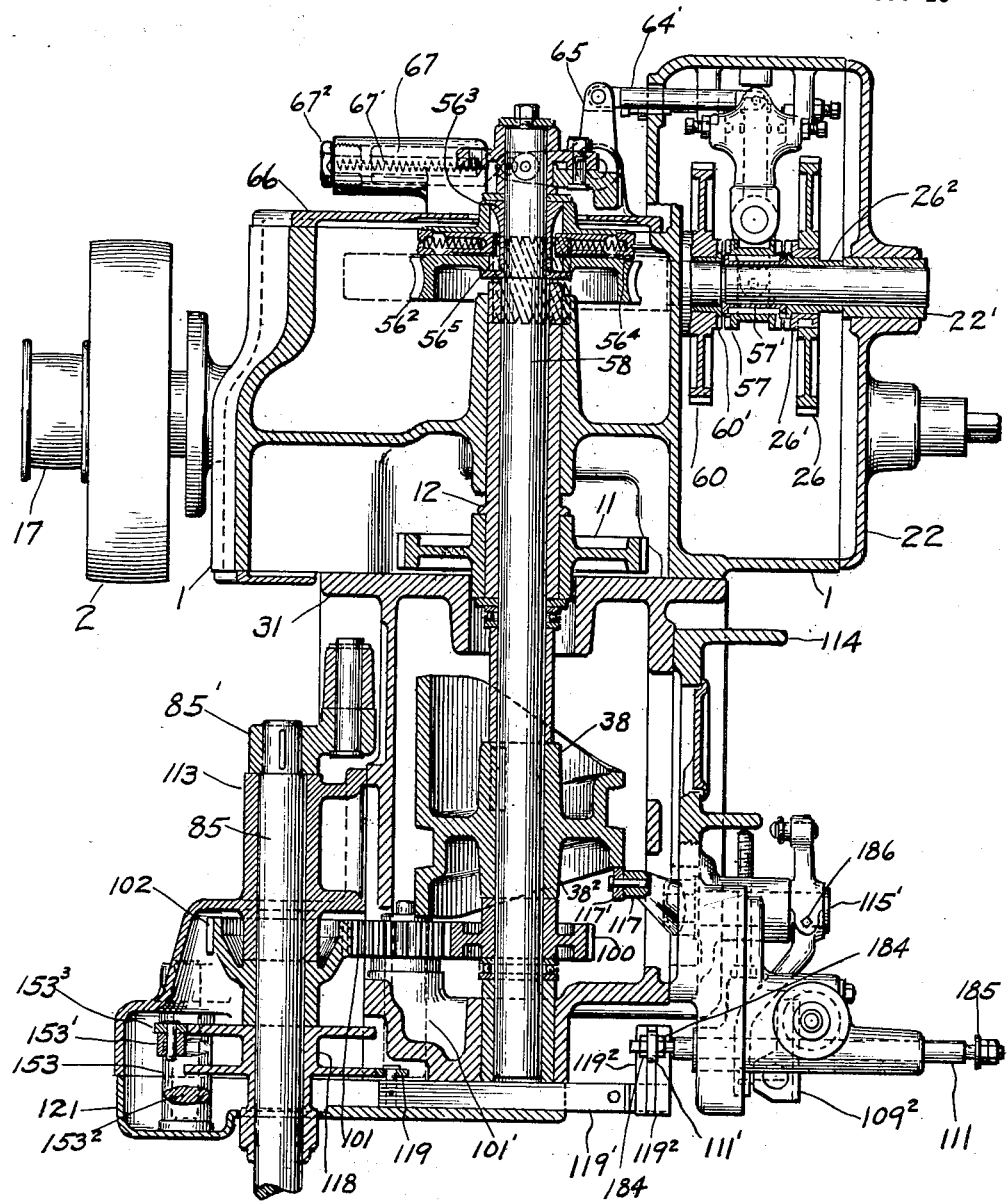
Figure 14:
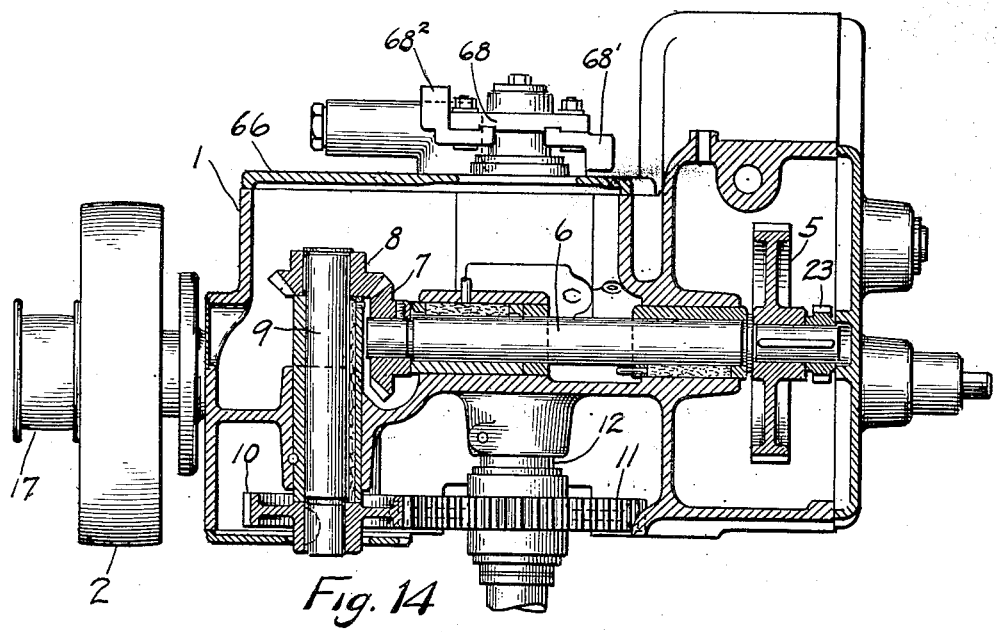
Figure 15:
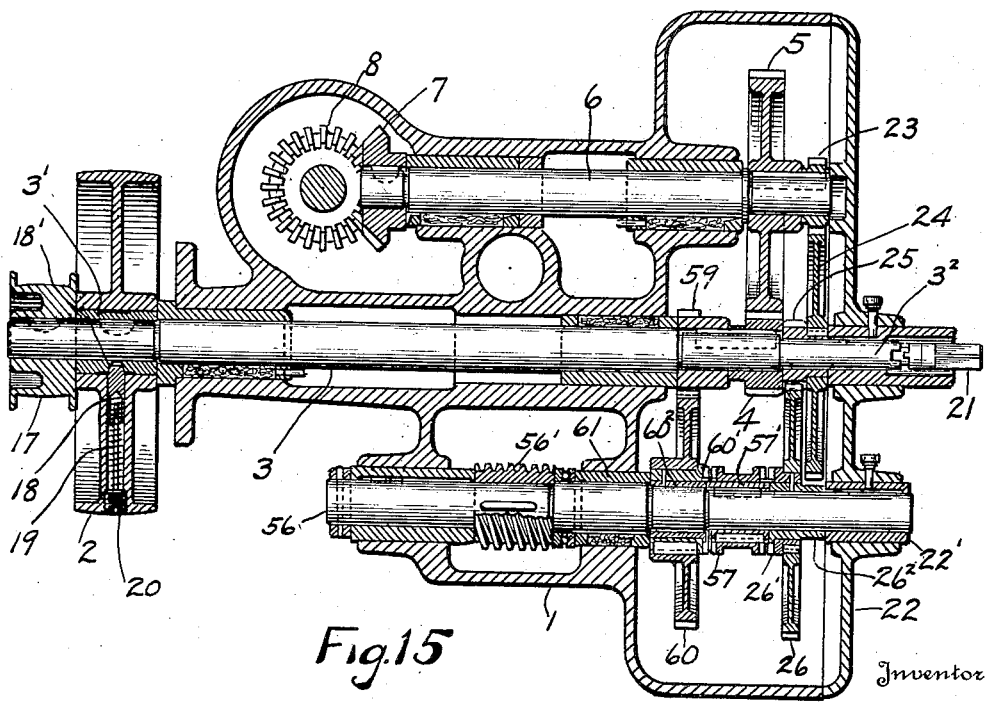
Figure 18:
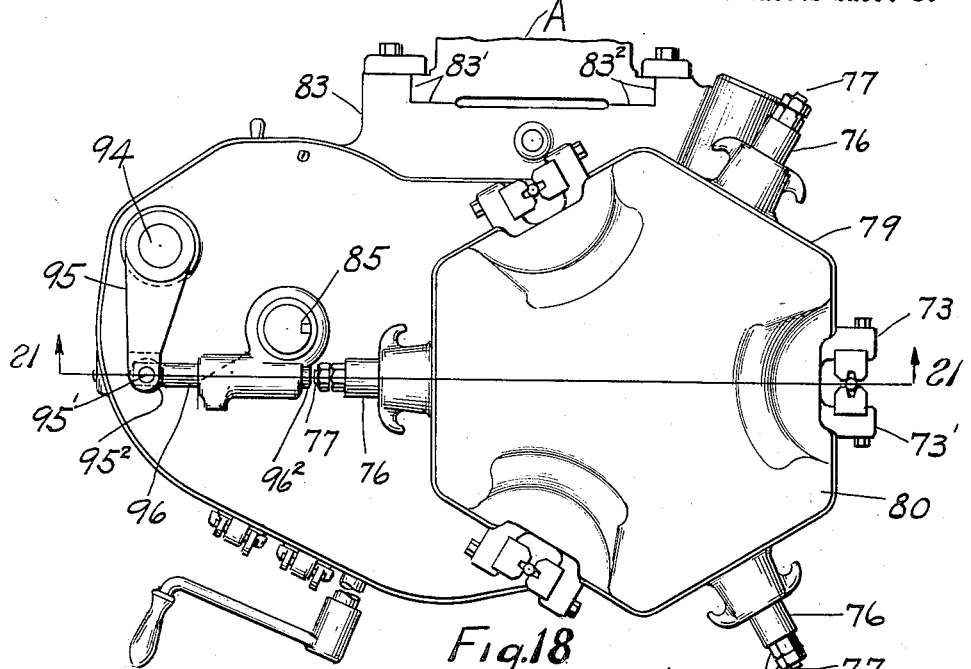
Figure 19:
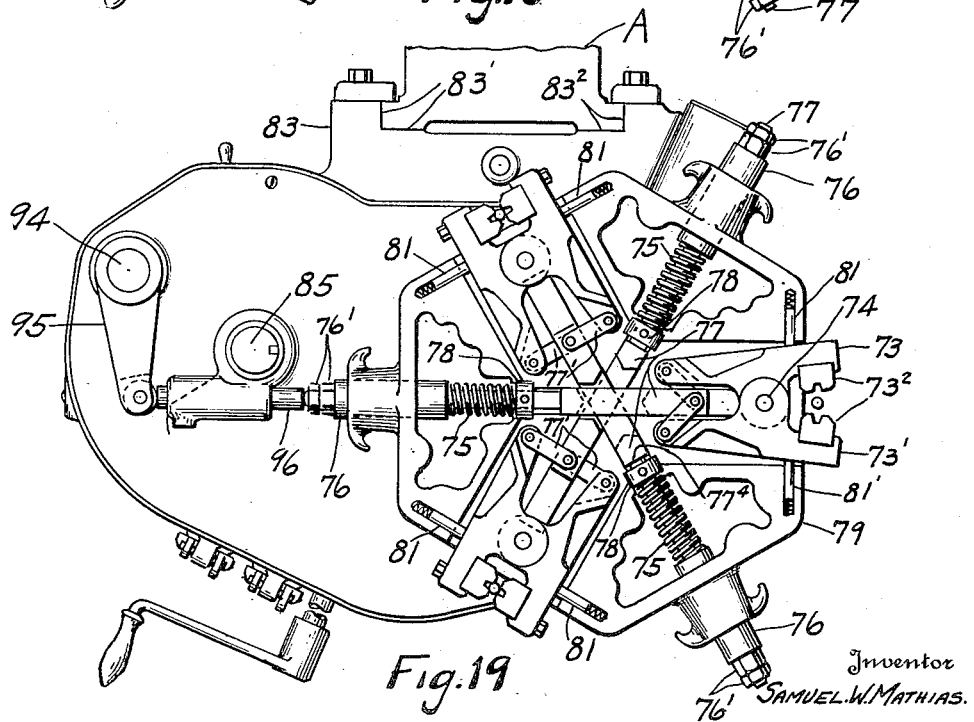
Figure 20:
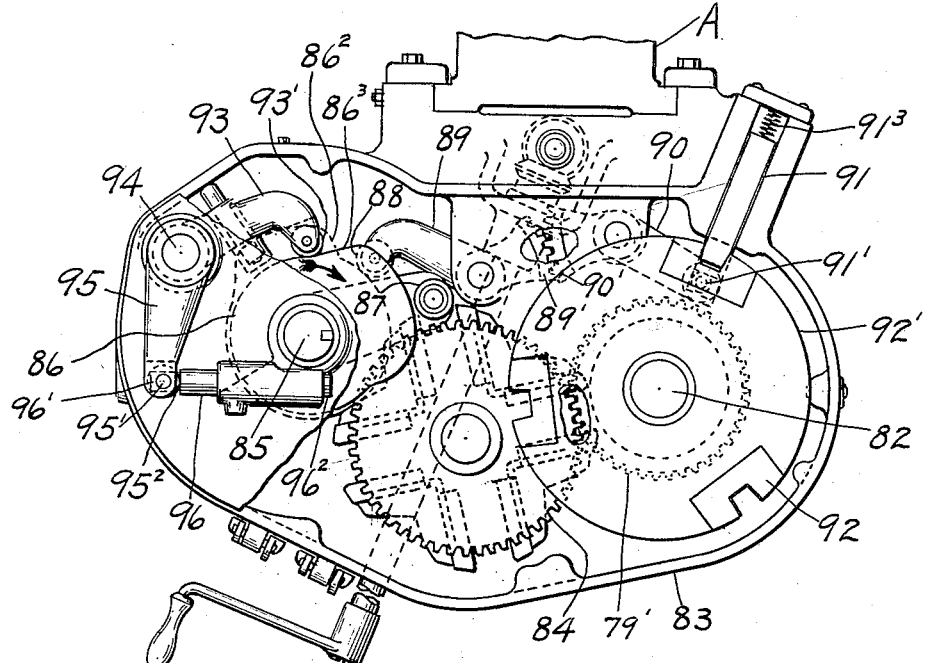
Figure 21:
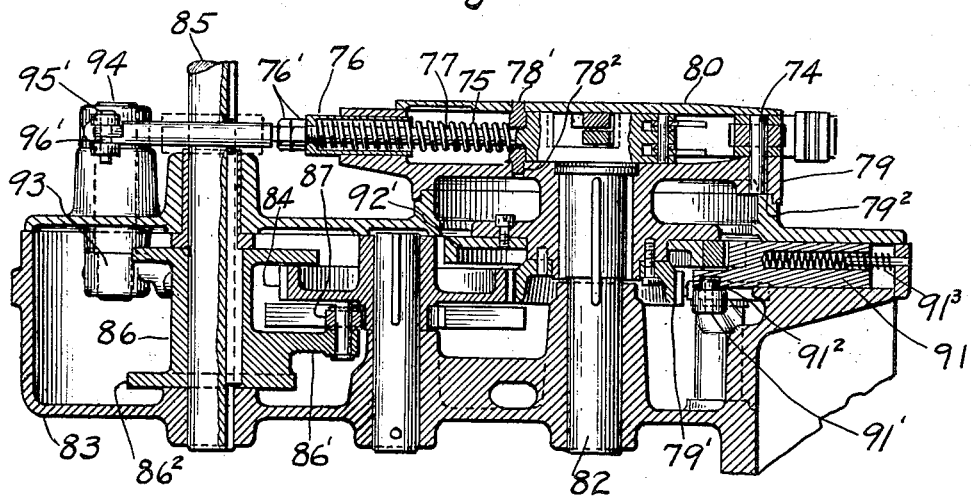
Figure 27:
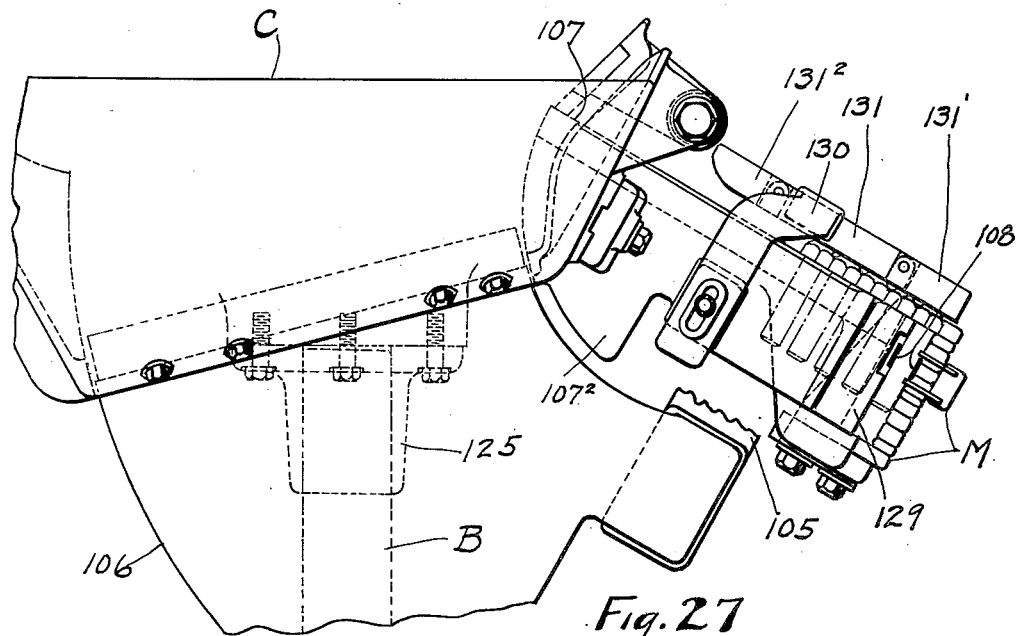
Figure 28:
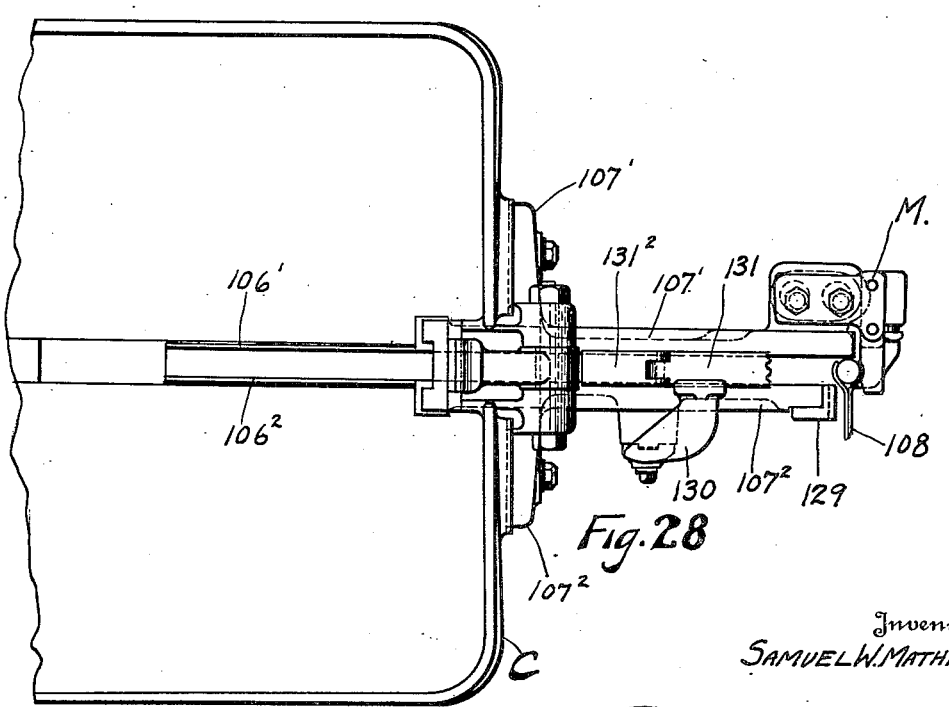

Referring to the accompanying drawings which are made a part hereof and on which similar reference characters indicate similar parts, Figure 1 is a perspective view of the front and right hand side of the complete machine, Figure 2, a perspective view of the front and left hand side of the complete machine, Figure 3, a left hand side view of the complete machine, Figure 4, a right hand side view of the complete machine, Figure 5, a plan view of the threading head unit and driving unit looking in the direction indicated by the arrow W', Fig. 3, Figure 6, a partial sectional plan view on line 6—6 of Fig. 3 to reveal the plan view of the forming head unit, Figure 7, an end view of Fig. 6 and shows a section through the forming head on line 7—7 Fig. 6, Figure 8, a partial front view of the top portion of the machine showing the threading unit, the forming unit and transfer mechanism as indicated by 8—8 Fig. 3, Figure 9, a partial plan view of the supply hopper, feeding chute, and transfer mechanism as indicated by 9—9, Fig. 4, Figure 10, a vertical section on line 10—10 of Fig. 8 showing the forming head unit, main cam shaft unit, driving unit and threading head unit, Figure 11, a right hand side view of the driving unit H of Fig. 4 with the cover removed, Figure 12, a partial section on line 12—$X^4$—$X^4$—$X^4$—$X^4$—12 of Fig. 11, Figure 13, a section on line 13—13 of Fig. 8 and a plan view as indicated by $W^4$ Fig. 8 also a partial section of 13'—13', Fig. 4, Figure 14, a section on line 14—14 of Fig. 11, Figure 15, a section on line 12—$X^8$—$X^9$—$X^{10}$—12 and $X^4$ of Fig. 11, Figure 16, a rear view and partical sectional views of the driving unit H looking in the direction indicated by the arrow $W^5$ of Fig. 4, Figure 17, a partial side view of Fig. 16 looking in the direction indicated by the arrow $W^6$ Fig. 16, with cover removed, Figure 18, a plan view of the chuck turret and indexing unit as indicated by 18—18 Fig. 4, Figure 19, the same view as Fig. 18 with chuck turret cover removed to expose the chucks, Figure 20, the same view as Fig. 18 with the chuck turret removed and part of the housing cover broken away to expose the operating mechanism, Figure 21, a section on line 21—21 of Fig. 18, Figure 22, an enlarged partial right hand side view of Fig. 4, showing the supply hopper and transfer mechanism, Figure 23, a reversed view of part of Fig. 8 showing the transfer and ejector mechanisms, Figure 24, a sectional view on line 24—24 of Fig. 23, Figure 25, a partial sectional view on line 25—25 of Fig. 22, Figure 26, a partial enlarged sectional view on line 26—26, Fig. 22, Figure 27, an enlarged view of the supply hopper and chute, Figure 28, a plan view of Figure 27 as indicated on 9—9, Fig. 4, Figure 29, a partial plan view of the chuck turret similar to Fig. 19, Figure 30, a partial end view of Fig. 19 showing the chuck gripper jaws gripping a long piece of work,

Figure 31, the same as Fig. 30, except a short piece of work is gripped in the chuck gripper jaws, Figure 32 is similar to Fig. 30 except the work is gripped by one head, Figure 33, a plan view of Fig. 32, Figure 34, a partial end view of Fig. 29, Figure 35, a plan view of the stop unit M, Fig. 4, Figure 36, a front view of Fig. 35, Figure 37, an end view of Fig. 35, Figure 38, a partial side view of the supply hopper C and chute, showing the escapement, Figure 39, a partial plan view of Fig. 38, Figure 40, a plan view of Fig. 38, Figure 41, a partial plan view of Fig. 38, Figure 42, a sectional end view on line 42—42, Fig. 38, Figure 43, a sectional view on line 43—43, Fig. 38, Figure 44, a partial plan view of Fig. 38 showing the relation of leaf, arm and escapement cam, Figure 45, a plan view of Fig. 35 showing the retainer, Figure 46, a partial plan view of Fig. 16 showing the clutch operating lever, Figure 47, a partial right hand side view of the machine showing the delivery trough, Figure 48, a partial front view of the machine showing the delivery trough, Figure 49, an enlarged partial view of the connecting rod as indicated by the arrow W$^8$, Fig. 47, Figure 50, a side view of gear 60, Fig. 47, Figure 51, an enlarged partial view of the driving unit H Fig. 47, Figure 52, a plan view on line 52—52, Fig. 47, Figure 53, a sectional view on line 53—53, Fig. 10, and Figure 54, a detail end view of an escapement plunger shown in Fig. 40.

In the drawings reference character A indicates a bed or base on which are mounted through the medium of stanchion B a supply hopper C, a chucking turret D' and indexing mechanism D, a pointing or forming unit E, having a pointing or forming head E', a cam unit F on which is mounted the threading unit G, having the threading die head G' and mounted on unit F is driving unit H. Mounted on the bed or base A are a chip container I, a bolt container J, a pump K and motor unit L.

The various units are completely organized and coordinated so that power is delivered to them from a single drive pulley 2 which can be driven from a main line shaft or from a motor mounted in the base A of the machine.

The driving mechanism for the forming and threading heads

The driving mechanism is best shown in Figs. 11, 12, 14 and 15.

Figure 10 is a sectional view of the driving unit H, threading unit G and pointing unit E. 1 is the main casting of the driving unit H carrying the driving pulley 2 mounted on shaft 3 through the medium of sleeve 3'. Sleeve 3' is keyed to shaft 3. Gear 4 is keyed to the shaft 3, said gear 4 driving gear 5. The bevel gear 7 is keyed to shaft 6, on the opposite end from gear 5, and drives bevel gear 8. Gear 8 is keyed to shaft 9, and on shaft 9 is keyed gear 10. Gear 10 drives gear 11 which latter is mounted loosely on a bearing or bushing 12. Gear 11 in turn drives gear 13 which is keyed to the spindle 14 which carries the threading die head G'. Gear 11 also drives gear 15 keyed to the spindle 16 on which is mounted the pointing or forming head E'. Mounted on shaft 3 is a pulley 17 which drives a pump K for delivering cooling fluid to the forming and threading heads.

In driving pulley 2 is placed a safety device consisting of a plunger 18 with a tapered end 18' which engages a tapered hole in the sleeve 3', the plunger 18 being bored out to receive a spring 19, spring 19 being abutted by the screw 20. This forms a safety device which permits of a given amount of power to be applied to the machine, but it will readily be seen that any unusual load thrown on shaft 3 will cause the plunger 18 to rise out of the tapered hole in sleeve 3' allowing the pulley 2 to revolve freely on the sleeve 3'. The end 3$^2$ of the shaft 3 is slotted to receive member 21 the end of which is squared to permit of revolving shaft 3 by a hand crank.

Removably mounted on the main casting 1 of the driving unit H is a plate or cover 22 permitting the gears to be removed and gears of different ratios substituted. Gears 4 and 5 may be exchanged in position to give a change of speed for the forming and threading heads and in place of the gears 4 and 5 may be substituted change gears of different relative sizes, to yield an extensive range of speeds for these heads, i.e. the threading die head G' and pointing head E'. Gears 23, 24, 25 and 26 are free to be removed endwise from their respective shafts.

The number of revolutions that the die head makes during that portion of the cycle of the cam shafts 58 and 85 allowed for the threading operation is controlled by the ratios of the gears 23 and 24. When it is desired to change the number of threads being cut on the work the gears 23 and 24 are removed and gears having the desired ratios are substituted. It should be kept in mind that gears 23 and 24 must be selected so as to allow for several more revolutions of the die head than the total number of threads to be cut on the work.

The threading unit

The threading unit is best shown in Figs. 5, 8 and 10.

The threading die head G' is screwed on the nose or end of spindle 14. This spindle 14 is carried by tapered roller bearings 27 and 27' which are fixed between shoulders 28' and 28² in the threading slider 28. Protecting flanges 29 and 29' are pressed on the spindle 14, to prevent entrance of foreign matter and to prevent leakage of lubricant. The outside diameter of these flanges is slightly less than the bore in the threading slider 28. The spindle 14 and bearings 27 and 27' are prevented from moving endwise by the adjusting nut 30. The threading slider 28 is fitted on top of the main cam unit housing 31 which is provided with flat bearing surfaces 32 and 32'. The threading slider 28 is provided with flat gibs 33 and 33' and taper gib 34 fitted so that the threading slider 28 moves freely on its bearing. The taper gib 34 is provided with two screws 35 and 35' which provide means of adjusting to take up any undue freedom or wear. A protecting plate 36 closes up the end of the bearings. It will be noted that the threading die head is mounted as close up to the taper bearing 27 as practical and that the threading slider 28 extends under and nearly to the end of the threading die head as best shown in Fig. 10.

A very great advantage of my novel arrangement of threading slider in a pointing and threading machine lies in its increased stability in operation as compared with existing machines, in which the spindles are advanced to such an extent beyond their bearings that the overhang is destructive, while in accordance with my arrangement of structure above described, the bearings being mounted in the threading slider are advanced with the spindle and slider.

Pressed into the threading slider 28 is stud 37 which carries a cam roller 37' which engages the main cam 38 which imparts movement to the threading die head slider.

The threading die head G' is of the type in which the threading cutters are opened by pulling the front unit axially as described in the application of Harry T. Shearer and Charles A. Reimschissel, Serial No. 328,634, filed December 27, 1928, for Die Heads. A lug 28' is provided on the threading slider 28 which is tapped to receive the adjusting trip screw 39 and is provided with a lock nut 39'. In the operation of the machine this trip screw 39 is set so that it will hit the top of the chuck unit D' and stop the advance of the threading slider 28. The action of the lead of the threading cutters continues to advance the front unit of the threading die head, tripping the die head open, thus giving the desired length of thread. If for any reason, in the threading operation, the threading die head fails to advance far enough to trip itself open, before the main cam 38 starts to return the threading unit G, it will be readily seen that the return action will pull open the threading die head, without any mishap to the die head or any of the operating mechanism.

Gears are selected for the threading operation to allow for several more revolutions of the die head than is required for the number of threads to be cut. This is done to allow for a reasonable variation (which happens frequently) in the starting of the threading die head on the work.

With this arrangement three very great advantages are obtained over existing machines for this type of work. (1) The opening of the die is assured without mishap to the threading die head or any mechanism of the machine. (2) The length of thread can be held to much closer limits. (3) The time required to reset the machine for a different length of thread is reduced considerably.

A yoke 40 pinned to a shaft 40' is carried by and free to pivot in a yoke bracket 40² which is fastened on top of the threading slider 28. On the outer end of the shaft 40' is pinned a lever 41. On the return stroke of the threading slider, just after the threading cutters have cleared the end of the work and before the threading slider has completed its return stroke, the lower end 41' of the lever 41 comes in contact with adjusting stop screw 42, shown in Fig. 2, and prevents the lower end of yoke 40 traveling farther. As the threading slider continues on its return stroke the flange 43 of G' comes in contact with the rollers 44 mounted in the lower end of yoke 40 causing flange 43 to be pushed forward and closing the threading die head.

The gear 13 is covered by a cover 45 which is fastened to the threading slider 28.

It is well known that a skilled operator can produce accurate threads on a hand operated machine by applying the right amount of pressure to start the threading die head on the work, quickly reducing the pressure the right amount as the threading die head advances and removing all pressure as soon as the threading die head has advanced sufficiently to lead the die head on the work. On existing machines of the type similar to the one outlined in this application it has been the custom to use one spring to duplicate the action of a skilled operator as described above. In practice this method has not proven satisfactory due to the fact that the single spring had to be made longer than the ideal spring to permit moving the threading die head away from the end of the work far enough to close the die head. A spring of the necessary length could not be adjusted to give the correct pressures during its entire period of action. As an example, supposing that it is necessary to travel the end of the threading cutters ⅝ inch beyond the end of the work to close the die head, that 100 lbs. pressure is required to start the threading die head on the work and that when the threading die head has advanced on the work ⅛ inch the pressure should drop to 20 lbs. It would be practically impossible to make a spring which would vary from 20 lbs. to 100 lbs. in a compression of ⅛ inch and still keep within a reasonable tension or within the elastic limit of the material when compressed another ⅝ inch.

In my device I overcome this by the introduction of a long spring 46 to take care of the over travel of the threading slider necessary to close the die head and use a separate spring 47 that has no other function than to feed the threading die head on the work. It will readily be seen that a spring can be made to give the desired starting pressure and have just the right number of coils so that the spring will lose its pressure as quickly as desired, as the threading die head advances.

The springs 46 and 47 are carried by the threading slider 28. Spring 46 is mounted in a sleeve 46' which is provided with a shoulder $46^2$ which limits or stops the action of the spring 46, the sleeve 46' being free to slide in the threading slider 28 and gear cover 45 which is bored to receive it. An adjusting screw $46^3$ is provided so that the tension of spring 46 can be changed. The adjusting screw $46^3$ is carried by a bracket $46^4$ attached to the threading slider 28. A lock screw $46^5$ is provided to lock the screw $46^3$. A spring 47 is mounted on a push rod 48. The sleeve 46' and screw $46^3$ are bored to receive the rod 48, the rod being free to slide in both members.

Adjusting nuts 48' are provided so that the tension of the spring 47 may be varied and adjusting nuts $48^3$ on the lower end of the rod 48 limit the action of the spring 47.

A bracket 49 is attached to the main casting 1, and is stationary relative to movement of the threading slider 28. On the return stroke of the threading slider the push rod 48 comes into contact with the bracket 49 compressing the springs 46 and 47, as shown in Fig. 10.

The complete cycle of the threading slider and its component parts is as follows:

Just as the indexing of the chuck turret D' is about completed the cam 38 starts to run away from the roller 37, the compression of springs 46 and 47 through the medium of push rod 48 pressing against bracket 49 force the threading slider 28 towards the work keeping the roller 37 in contact with the cam 38 until the thread cutting tools just about touch the work at which time the finished boss $28^3$ on threading slider 28 will have come in contact with the shoulder $46^2$ on sleeve 46' stopping the action of the spring 46. As the cam 38 continues to revolve the short starting spring 47 will force the thread cutting tools on the work. The roller 37' will leave the cam 38 as the angle of the cam is made greater than any angle that the cam roller will advance on regardless of the length of the lead of the thread. As the thread cutting tools advance, the pressure of the spring 47 falls rapidly and when the thread cutting tools have advanced a distance sufficiently to lead the die head on the work end of screw $46^3$ comes into contact with the stop unit $48^3$ stopping the action of spring 47 on the threading cutters and threading slider 28. As the threading slider 28 continues to advance, the rod 48 and its component parts lose their independent movement and travel with the threading slider 28. Upon the completion of the movement of the threading slider 28 necessary to cut the thread, the threading slider 28 is withdrawn to its rearward position, as shown in Fig. 10, by the action of cam 38 against roller 37'. This rearward movement brings the rod 48 into contact with bracket 49 compressing the springs 46 and 47, placing rod 48 and its component parts in operative position.

As an object of my machine is to secure accurately cut threads and as the pitch of the threads cut is one of prime importance it is obvious that there should be no excessive pressure on the lead nut, formed by the thread cutting chasers. In this connection I provide novel means to limit and control the pressure. To reduce the sliding frictional resistance of the driving member for revolving the die head, I employ a gear 13 having a face of sufficient width to be fully engaged with gear 11, during the entire movement of the threading slider, so that the sliding action against the driving pressure is reduced considerably, due to the increased diameter of the driving member, and that the driving member is revolving, as compared with existing machines of the type similar to one outlined in this application. Furthermore the threading slider is mounted on vertical or semi-vertical bearings so that the weight of the threading unit E and die head E' would overcome the sliding frictional resistance of driving the die head, and the slider sliding on its bearings. To control this advance of the threading unit and to apply some resistance to the thread cutting chasers when desired, I have counterbalanced the threading unit E and have provided a number of counter-balanced wafers so that the pressure on the thread cutting chasers can be controlled to a nicety.

A boss 28⁴ on the threading slider 28 is drilled and slotted to receive one end of a cable 177 which passes over a sheave 178 that is carried by the main casting 1, Fig. 5. The other end of the cable 177 is fastened into a sheave 179, Fig. 3, carried by main casting 1. Another cable 180, has one end fastened to sheave 179 and to the other end is fastened a balance weight 181. Balance weight wafers 182 are attached to the balance weight. The number of wafers 182 can be varied to suit the various conditions met in machines of this nature.

The forming unit

This structure is best shown in Figs. 6, 7, 8 and 10.

The forming head E' is fastened to the spindle 16, which spindle is carried by tapered roller bearings 51'—51² which are fixed between shoulders 52' and 52² in the forming slider 52.

Protecting flanges 53 and 53' are pressed on the spindle 16, the outside diameter of these flanges being slightly less than the bore in the forming slider 52 to permit them to rotate freely in the forming slider. The spindle and bearings are prevented from moving endwise by the adjusting nut 51.

A saddle 54 is fastened to the bed or base A of the machine to form a bearing for the forming slider to slide in. The saddle 54 is provided with flat gibs 54' and 54² and a taper gib 54³ fitted so that the slider 52 may readily be moved. A stud 55 is pressed into the slider 52 which carries a cam roller 55', that fits into the grooved cam 38' of cam 38 which imparts movement to the forming slider and insures that the forming tool will travel a predetermined distance.

The face of gear 15 is of sufficient width to be fully engaged with the driving gear 11 during the entire movement of the forming slider.

A forming tool 50 having any desired contour on its face 50' is clamped in the head E' by screw 50³; an abutting screw 50² is provided to take the end thrust during the forming operation.

Accelerating mechanism

An object of very great importance in my invention is to provide means for changing the speed of, that is, accelerating or slowing down that portion of the cycle required for the withdrawal of the threading die head and the forming head off the work and the indexing of the chuck turret. This is obtained by changing the speed of the cam shaft 58 and can be seen by referring to Figs. 10, 11, 12, 13, 15, 16, 17, 46 and 53.

During the forming and threading operations the cam shaft 58 is driven from shaft 6 through the medium of a change gear 23 which is keyed to shaft 6, gear 23 meshes with change gear 24 which is keyed to a pinion 25, this pinion being free to rotate on shaft 3 and at a speed independent of the speed of shaft 3. The pinion 25 drives the gear 26 into which is pressed a toothed clutch 26'. A bushing 26² is pressed into the clutch 26'. This bushing 26² is free to rotate on the worm shaft 56 and prevented from moving endwise by the bushing 22' fastened in cover 22 and center clutch bushing 57'. The center clutch 57 is keyed to the bushing 57' and fitted free enough so that the clutch may be moved longitudinally. The bushing 57' is keyed to worm shaft 56. Keyed to the worm shaft 56 is a worm 56', which meshes with the worm wheel 56². This worm wheel drives sleeve 56³ through the medium of plungers 56⁴ provided with tapered ends normally held in engagement with tapered slots 56⁵ in the sleeve 56³ by compression springs 56⁶. The sleeve 56³ is keyed to the main cam shaft 58. A pinion 59 keyed to shaft 3 drives the gear 60 into which is pressed a tooth clutch 60'. A bushing 60² is pressed into the clutch 60' and is prevented from moving endwise by center clutch bushing 57' and bushing 61 fastened into the main housing 1.

The main drive shaft 3 rotates at a constant speed and through the medium of change gears 4 and 5 rotates shaft 6 and the threading die head and forming head which are driven from shaft 6 at a series of speeds as already described.

It will be seen that when the center clutch 57 is engaged with clutch 26' that the cam shaft 58 will be driven at a speed relative to the threading die head speed through the change gears 23, 24 and gears 25, 26, 56' and 56². When the center clutch 57 is engaged with clutch 60' the cam shaft 58 will be driven at a speed independent of the speed of the threading die head through the train of gears 59, 60, 56' and 56². The center clutch 57 may be operated by a "load and fire" type mechanism as follows:—The center clutch 57 is provided with a groove 57⁴ to receive two shoes 62'—62² which are carried and free to pivot, on pins 62³ and 62⁴ pressed into the clutch yoke 62. The clutch yoke 62 is carried on a shaft 63 on which it is free to pivot. Mounted beside the clutch yoke on shaft 63 and also free to pivot on the aforesaid shaft is a lever 64. Attached to the outer end of the lever 64 is a link 64' connected to a bell crank 65 which is free to pivot on a stud 65' pressed into the worm gear cover 66 which is fastened to the main driving housing 1. On the outer end of the bell crank 65 are mounted rollers 65² and 65³ which are free to rotate on pins pressed into the bell crank. Roller 65² engages a vee plunger 67 which is backed with a compression spring 67'. The worm gear cover 66 is provided with a boss 66' which is bored to receive the vee plunger 67 and tapped for the abutting screw 67².

In the upper end of the clutch yoke 62 are pressed two sets of hardened steel plugs, Fig. 16. One set 69 and 69' comes in contact with the ends of the two screws 70 and 70' which are screwed into lugs that are a part of the main driving housing 1, the function being to limit the throw of the clutch 57 and clutch yoke 62. The upper end of lever 64 is provided with two lugs which are tapped to receive stop screws 71 and 71'. These screws are set a sufficient distance away from the set of plugs 72 and 72' in clutch yoke 62 so that in the movement of the bell crank 65 and its component parts, the bell crank roller 65² will be moved beyond the center of the vee plunger 67 before one of the screws 71 and 71' comes in contact with one of the plugs 72 and 72' and starts to move the clutch yoke 62 and the center clutch 57.

On the main cam shaft 58 is keyed a dog wheel 68 which is provided with a fixed dog 68' and an adjustable dog 68². The dogs 68' and 68² have opposed cam faces which engage at intervals, the roller 65³ carried by the bell crank 65. The dog wheel 68 has an arcuate slot 68³. The dog 68² is held on the dog wheel 68 by a bolt or screw 68⁴. The dog 68² may, therefore, be adjusted around the dog wheel 68 to either end of the slot.

Briefly, the operation of the above mechanism is as follows: Just as the indexing of the chuck turret D' is about completed, and the threading turret G and the forming unit E are about to advance towards the work, the fixed dog 68' comes into contact with the roller 65³ moving the bell crank 65 towards its center position. As this movement takes place, the roller 65² is forcing the vee plunger 67 down compressing the spring 67'. About the time that the roller 65² is at the top of the vee plunger 67 the end of screw 71 in lever 64 comes in contact with the hardened plug 72. As the dog 68' continues to move the bell crank 65, the center clutch 57 will be partly withdrawn from the accelerating speed clutch 60' and the roller 65² will be carried beyond the center of the vee plunger 67. As the roller 65² is carried beyond the center of the vee plunger 67 the compressed spring 67' forces the bell crank 65 ahead of the action of the dog 68' giving a quick motion to the clutch yoke 62, completing the withdrawal of center clutch 57 from the accelerating speed clutch 60' and throwing the center clutch 57 into engagement with the clutch 26' thereby changing the speed of the cam shaft 58 from the accelerated speed to a speed relative to the die head. The adjustable dog 68² may be adjusted about the dog wheel 68 and set to throw the center clutch 57 from the clutch 26' into engagement with the accelerated speed clutch 60' at the instant that the threading and forming operations are completed. The action of throwing clutch 57 into engagement with clutch 60' is the same as that of throwing it into engagement with clutch 26'.

Driving of the cam shafts

This structure is best shown in Figs. 10, 13, 20 and 21.

The main cam 38 is keyed to the cam shaft 58. The lower end of cam shaft 58 is supported in the cam housing 31 which is bolted to the top of the base A. The upper end of cam shaft 58 is supported by the main casting 1 which is bolted to the rear end of cam housing 31. Pinned and keyed to the cam shaft 58 is a gear 100 which engages an intermediate gear 101 that is free to rotate on a shaft 101' which is pressed into the cam housing 31. The intermediate gear 101 engages a gear 102 which is keyed to the auxiliary cam shaft 85. The upper end of the auxiliary cam shaft 85 is supported by an auxiliary cam bracket 113 which is bolted to the cam housing 31. The lower end of the auxiliary cam shaft 85 is supported in the indexing mechanism D. The ratio of gears 100 and 102 is one to one so that the auxiliary cam shaft 85 will be driven at the same speed as the main cam shaft 58. The functions of the cam 38 and the cam shafts 58 and 85 are described in connection with the various units with which they function.

Chuck turret and indexing mechanism

In accordance with important objects of my invention as seen in Figs. 18, 19, 20, 21, 29, 30, 31, 32, 33 and 34, I have provided a chuck for gripping or holding the work in line with the axis of the threading die head wherein the work is held square or in line with the axis of the threading die head regardless of the variation in diameter of the work and wherein means are provided for chucking long work near the threaded portion without any loss of gripping pressure on the work.

This is accomplished by mounting the chuck grippers 73 and 73' on a pivot pin 74 which is parallel with the axis of the work and the threading die head G'.

It will be readily seen that by this construction the gripping or locating faces travel in a plane parallel with the axis of the work and are throughout the entire movement parallel to the axis of the work.

In devices wherein the pivot point of the chuck grippers is at a right angle to the axis of the bolt, the gripping or locating faces are parallel to the axis of the bolt at one place only and when the diameter of the work varies as it does one to another, only a point contact on the work is secured.

Fig. 30 illustrated clearly how long work can project any desired distance below the chuck grippers without affecting the gripping pressure. On machines in which the chuck grippers pivot on a pin that is at right angles to the axis of the work, it is necessary to extend the chuck gripper jaws further away from the center of pivot as the length of work is increased, thereby reducing the effective gripping pressure.

As the construction of each of the three chucks is the same, a description of one will therefore be deemed sufficient. The chuck grippers 73 and 73' are operated through the medium of toggle links 77' one end of which is attached to the chuck grippers 73 and 73' and the other end of the links being attached to a rod 77 on which is assembled a spring 75. One end of the spring 75 abuts against a stationary block 78 held in place by two trunnions 78' and 78$^2$ that project into the chuck turret 79 and chuck turret cover 80. The spring 75 is assembled in place with an initial tension, power for which is applied to links 77' through the medium of a slidable sleeve 76, nut 76' and rod 77. Removable jaws 73$^2$ are mounted in the chuck grippers 73 and 73'.

When a type of jaw is used that grips on the head of the work, as shown by Figs. 32 and 33, or on the body of work, as shown by Figs. 18, 19, 30 and 31, the jaws are so made that the work will be gripped before the rod 77 reaches the limit of its travel, which is when the shoulder 77$^4$ on rod 77 comes in contact with stationary block 78.

It will be seen that the shoulder 77$^4$ on rod 77 limits the closing of the chuck grippers 73 and 73' to a predetermined distance, which permits jaws to be made that will allow the work to float in the jaws a slight amount, as best shown by Figs. 29 and 34. In this type of jaw 99 the work is approximately centered and squared up by the jaw faces 99' which have a slightly larger radius than the radius of the work and in this case the work having a square head, is prevented from turning in the jaw by the jaw face 99$^2$. The lips 99$^3$ prevent the bolt from slipping down during the forming operation and the starting of the thread cutting tools on the bolt. The bolt is prevented from pulling out of the jaw by the faces 99'.

The sliding blocks 81' together with the chuck turret cover 80 provide means for fully inclosing the operating mechanism of the chuck grippers to prevent entrance of foreign matter.

The chuck turret 79 rests on the finished seat 79$^2$ and pivots on the shaft 82 which is pressed into the main supporting casing 83.

Fastened to the chuck turret 79 is a gear 79' which engages a gear cut on the four station Geneva wheel 84, these gears having a ratio of 4 to 3 so that one quarter of a revolution of the Geneva wheel 84 turns the chuck turret 79 one third of a revolution. Keyed to the auxiliary cam shaft 85, which revolves continuously during the operation of the machine, is a double cam 86 provided with an arm 86' which carries the Geneva wheel roller 87.

Just before the roller 87 engages the Geneva wheel 84 preparatory to indexing the chuck turret 79 a lobe 86$^2$ on double cam 86 comes into contact with a roller 88 carried by a lever 89 which is provided with a segment of a gear 89' which engages a segment of a gear 90' that is a part of the lever 90. The opposite end of lever 90 engages a lock bolt 91 through the medium of a pin 91' and a block 91$^2$. The double cam 86, continuing to revolve lobe 86$^2$, forces the lever 89 out and withdraws the lock bolt 91 from the lock bolt block 92 which is fastened in plate 92' which in turn is fastened to the chuck turret 79. The contour of lobe 86$^2$ is so made and timed that the lock bolt 91 will be only partially withdrawn at the time that the roller 88 engages the Geneva wheel 84. The lock bolt 91 is entirely released from being controlled by lobe 86$^2$ before the indexing of the chuck turret 79 is completed. The lock bolt 91 is backed with a spring 91$^3$ which forces it into the slot in the lock bolt block 92 and retains it there until it is again withdrawn through the action of the lobe 86$^2$.

After the indexing of the chuck turret is completed a lobe 86$^3$ on the double cam 86 comes into contact with a roller 93' which is carried by a lever 93 keyed to a shaft 94. On the opposite end of shaft 94 is keyed a lever 95. Mounted in the upper end of this lever 95 is a pin 95' carrying a roller 95$^2$ which engages a plunger 96 having a projection 96' which is drilled to receive the pin 95'. The drilled hole in projection 96' is slightly larger than the diameter of pin 95' to allow a movement to lever 95 without binding.

As the double cam 86 continues to revolve, the lobe 86$^3$ through levers 93 and 95 forces the end 96$^2$ of plunger 96 against one of the chuck rods 77 compressing the spring 75 and forcing the chuck grippers 73 and 73' open, so that the finished work may drop or be ejected out of the jaws 73$^2$. A dwell on the cam lobe 86$^3$ holds the chuck grippers open a sufficient length of time to permit the transfer mechanism to insert a new piece which will hereinafter be described. As the double cam 86 continues to revolve, the lobe 86$^3$ is carried away from roller 93' permitting the tension of spring 75 through chuck rod 77 and toggle links 77' to close the chuck and grip the work for the forming and threading operation.

Another object of importance in my invention is to secure means of quickly setting the chuck turret D' and its operating mechanism for the various lengths and classes of work. This is accomplished by assembling the chuck turret D', its system of cams, gearing, levers, etc., required to operate the chuck grippers, the lock bolt and the indexing mechanism of chuck turret, in one supporting casing 83. The supporting casing 83 is provided with bearings 83' and 83² which are fitted to the base A so that the complete unit D as shown in Fig. 3 can be moved parallel to the axis of the threading head through the medium of a hand-operated elevating screw 97 to which is pinned a bevel pinion 97' which engages a bevel gear 98 pinned to a shaft 98' the upper end of this shaft being squared to receive a hand crank. The threaded end of the elevating screw 97 engages a stationary nut 99 fastened to the base A.

*The supply hopper and transfer operating mechanism*

This structure is best shown in Figs. 3, 8, 9, 13, 22 to 28, 35, 36, 37 and 45.

A crank 85' is keyed to the upper end of the auxiliary cam shaft 85 which gives an oscillating movement to lever 103 through the medium of a connecting rod 104 and universal joints 104' and 104², Fig. 3.

The lever 103 is keyed to a shaft 103' to which is keyed at the opposite end an arm 105. The shaft 103' is supported by the auxiliary cam bracket 113 and the main transfer bracket 114 both of which are bolted to the main cam housing 31, Figs. 8, 9. Attached to the arm 105 is a leaf 106 which operates through a slot in the center of supply hopper C.

The supply hopper C is fastened to the upper end of the main transfer bracket 114 and supported through the medium of a flange 125 which is supplied by a stanchion B fastened to the base A. The leaf 106 is made up of two blades 106' and 106² so spaced by blocks that the body of the work or bolt can drop between the sides 106' and 106² and hang in the leaf by a projection on the work or the head of the bolt. When the leaf is in its uppermost position its top edges are even and parallel with the top of a chute 107 permitting the work or bolts to slide by gravity out of the leaf into the chute since the chute is set at an incline. The chute sides 107' and 107² are fastened to the hopper C and can be adjusted to suit the various diameters of work or bolts. At the end of the chute side 107' is fastened a stop unit M which carries a number of stop blocks 107³ of different thicknesses, two blocks 107⁴, two bolt retainers 126 and a plunger block 128. The stop blocks 107³, blocks 107⁴ and plunger block 128 are mounted on two pins 129' and 129² which are carried by a bracket 107⁶ that is bolted to the chute side 107'. The bracket 107⁶ is adjustable lengthwise and crosswise on the chute so as to locate the work in correct relation to the transfer mechanism and to position the retainers 126 relative to the diameter of the work. The blocks 107³ stop the bolts at the lower end of the chute at a position so they may be picked up by the transfer fingers 108, that are fastened to an arm 108'. The arm 108' is carried by a shaft 108² on the lower end of which is cut a pinion 108⁴ that engages a rack 109.

The shaft 108² is carried in a head 108³ which is pinned to a sleeve 110. On the lower end of sleeve 110 a pinion 110' is cut, which engages a rack 111. The sleeve 110 is carried in a bracket 112, this bracket being adjustable on and clamped to the main transfer bracket 114.

In transferring the work from the chute to the chuck turret D' two movements are imparted to the transfer finger, each movement being approximately 180 degrees, and at right angles one to the other. These movements occur in part simultaneously. Starting with the transfer finger at the chute the first 180° movement (which for convenience in describing will hereinafter be so called) turns the transfer finger 108 so that it will be in a position to pull off the bolt after the bolt is gripped in the chuck turret D'. The second 180° movement turns the bolt down into the chuck turret D' with the end of the bolt to be threaded towards the die head G'. The first 180° movement is obtained by imparting a movement to the rack 109 which is provided with a bushing 109' on which is turned a flange that engages a slot in the head 109² that is attached to shaft 109³ by a screw 109⁴. The shaft 109³ is free to slide in the bearing 114' which is a part of the main transfer bracket 114. The screw 109⁴ engages the lever 115 through the medium of a block 109⁵. The lever 115 is fastened to a shaft 115' by two screws 186 which has a bearing provided for it in the main transfer bracket 114. On the opposite end of the lever 115 is attached one end of a tension spring 116 the other end of which is attached to a pin 116' pressed into the base A. On the end of the shaft 115' opposite from the lever 115 is keyed a lever 117 which carries a roller 117' that engages the main cam 38. As the main cam 38 revolves the lobe 38² forces the lever 117 down which in turn forces the rack 109, turning the pinion 108⁴ through 180°.

Mounted on the auxiliary cam shaft 85 is a double cam 118 which engages a roller 119 carried by a sliding bar 119' to which is fastened a head 119² that is slotted to receive a block 111' fastened to the rack 111. A pin 119³ is pressed into the sliding bar 119' to which is attached one end of a tension spring 120, the other end of the spring 120 being attached to the auxiliary cam bracket cover 121.

As the cam shaft 85 continues to rotate and after the transfer finger 108 has made part of its first 180° turn, the lobe 118' starts to run away from the roller 119 permitting the tension spring 120 to pull the sliding bar 119' and rack 111 towards the auxiliary cam shaft 85 and turning the transfer finger 108 on its second 180° turn, folding the bolt into the chuck turret. The contour of lobe 118' is such that the first 180° turn of the transfer finger 108 is completed before the second 180° turn is completed. It will be noted that since the final movement of the bolt into the chuck turret is through the medium of the tension spring 120, no failure can occur to the transfer mechanism if for any reason the bolt cannot enter the chuck turret. After the work or bolt is gripped in the chuck turret, lobe 118' forces the sliding bar 119' and rack 111 away from the auxiliary cam shaft 85 which causes the pinion 110' to turn, pulling the transfer finger 108 off the bolt which has now been gripped in the chuck turret and returning the second 180° movement of the transfer finger to its original position. After this movement is partly completed the lobe 38² on the main cam 38 starts to run away from the roller 117' permitting the spring 116 to return finger 108 to its original position. At the beginning of the first 180° movement the spring 116 exerts its pressure through the medium of lever 115 and component parts. This movement is completed after the second 180° movement is completed. On the return of the first 180° movement the transfer finger 108 picks up a bolt. Since power for this movement is obtained from the tension spring 116 no failure can occur to the transfer mechanism if for any reason an obstruction is in the way of the transfer finger 108 picking up a bolt in the chute.

I have described the mechanical movements of taking a piece of work out of the chute and placing it in the chute turret D' by two 180° movements, and on the return of the two 180° movements, picking up another piece of work.

Means are provided to control the final position of the transfer finger 108 at the end of each 180° movement. The distance that the transfer finger 108 enters the chute is controlled by limiting the movement of the rack 109 at the end of the return of the first 180° movement. This is accomplished by the end of rack 109 coming in contact with an adjusting screw 183 in the end of head 108³. The transfer finger 108 is squared up with the face of the chute by moving the rack 111, independent of the throw of cam lobe 118', through the medium of adjusting nuts 184 on each side of block 111' thereby controlling the position of the transfer finger 108 at the end of the return movement of the second 180° movement. The distance that the transfer finger 108 enters the work in the chuck jaws 73² is controlled by limiting the movement of rack 111 at the end of the second 180° movement through the medium of an adjustable stop nut 185 on rack 111 coming in contact with the bracket 112. The transfer finger 108 is squared up with the chuck jaws 73² by moving the rack 109 independent of the throw of the cam lobe 38² by rotating the lever 115 on shaft 115' through the medium of adjusting screws 186 in lever 115. The shaft 115' is provided with pockets 115² to receive the ends of the screws.

The length of the finished work is controlled by the position of the bracket 112 in relation to the top of the chute. As heretofore described the second 180° turn of the transfer finger folds the bolt from the chute into the chuck grippers so that the end of the bolt points up towards the forming and threading die head. The bolt makes a complete half circle the pivot of which is in the bracket 112, and therefore raising the bracket 112 towards the chute shortens the arc and the bolt will be located higher up in the grips or nearer the forming tool and as heretofore shown the forming tool traveling a predetermined distance the finished bolt will be shorter. Lowering the bracket 112 lengthens the arc and therefore the finished bolt will be longer. The arm 108' which carries the fingers 108 is adjustable on the shaft 108². This adjustment is provided so that the fingers 108 can be set to clear the chuck grippers and does not affect the length of the bolt.

The bolt retainers 126 pivot on a pin 129' and are provided with a lug 126' which engages a plunger 127 that is carried by a plunger block 128. The plunger 127 is drilled to receive a compression spring 127' the action of which normally keeps the curved points 126² on the bolt retainers 126 said curved points 126² projecting out beyond the stop blocks 107³ which prevents the work from falling out of the chute while the transfer finger is delivering a bolt to the turret chuck.

The action of the compression spring 127' on the bolt retainers 126 is limited by the rear end of the bolt retainers 126 coming into contact with a bushing 129³ carried on pin 129². The bolt retainers 126 are spaced apart by the plunger block 128 and two blocks 107⁴ so that the transfer finger 108 may enter between the bolt retainers 126 and pick up a bolt. The action of the transfer fingers 108 removing a bolt from the chute forces the bolt retainers 126 back out of the way, the spring 127' returning the bolt retainers to their normal position as the bolt leaves the chute. The bolt retainers 126 can be placed in the bracket 107$^6$ at any desired height by varying the position of the different thickness blocks 107$^3$ in relation to the bolt retainers 126. This permits the transfer finger to be set to pick the bolt up at any desired place on the body of the work. The width of opening between the bolt retainers 126 can be varied by removing one or both blocks 107$^4$ from between the bolt retainers 126 and placing the blocks 107$^4$ between the stop blocks 107$^3$ or at the bottom of the bracket 107$^6$, permitting the stop unit to be set for very short work and narrow transfer fingers.

A bolt retaining plate 129 is adjustably attached to the end of the chute side 107$^2$ which together with the chute stop unit M which is adjustable on the chute 107' can be set to control the size of opening at the end of the chute. The retaining plate 129 is provided with a notch opposite the bolt retainers 126 to permit the transfer finger to enter the chute.

A bracket 130 carrying a top runner 131 to which is hinged runners 131' and 131$^2$ which are normally held parallel with the top runner 131 by a tension spring 131$^3$ one end of which is attached to 131', the other end being attached to 131$^2$. The bracket 130 is adjustably attached to the chute 107$^2$ and can be set to prevent the bolt heads crowding on top of each other.

*Ejecting mechanism*

This mechanism is best shown in Figs. 8, 13 and 23.

An ejector 150 is provided to eject the work from the jaws 73$^2$ in case it does not drop out when the chuck grippers 73 and 73' are opened. This ejector is attached to a head 150' which is hinged on the bar 150$^2$, the head 150' being held normally in a parallel position with the bar 150$^2$ by a tension spring 151 one end of which is attached to the bar 150$^2$ and the other end of which is attached to the head 150'. The bar 150$^2$ on the opposite end from head 150' is slotted to receive a block 152 which is pivoted on a pin 152' that is pressed into one lever 153$^2$ of a double lever 153. The double lever 153 is pivoted on a shaft 154 pressed into the auxiliary cam bracket 113. The other lever 153' of the double lever 153 carries a roller 153$^3$ that engages a lobe 118$^2$ on the double cam 118.

A pin 155 is pressed into the bar 150$^2$ to which is attached one end of a tension spring 156 the other end being attached to a pin 157 which is pressed into the main transfer bracket 114.

After the chuck grippers 73 and 73' have been opened the lobe 118$^2$ starts to run away from the roller 153$^2$ permitting the tension spring 156 to pull the bar 150$^2$ towards the open jaws 73$^2$ so that the ejector 150 can push the work out of the jaws 73$^2$ in case the work has not dropped out. As the cam 118 continues to revolve the contour of the lobe 118$^3$ is so shaped and timed that it will withdraw the ejector 150 before a new piece of work is inserted in the jaws 73$^2$. As the ejecting movement is through the medium of a tension spring 156 and the return position through the action of the cam lobe 118$^3$ no mishap can occur to the ejector mechanism in case the ejector should fail to remove the work from the jaws 73$^2$.

*Escapement mechanism*

Figs. 38 to 44 and 54 show an escapement that is built into the right hand side of chute 107 which permits only one piece of work at a time to be fed to the end of the chute. A stop plunger 132 is carried in a bracket 132' and a release plunger 133 that is carried in a bracket 133' are adjustably attached to the right hand chute 107$^2$. This adjustment permits the plungers 132 and 133 to be set close together for small diameters of work and further apart as the diameter of work increases. Movement in one direction of plungers 132 and 133 is obtained through a cam 134 attached to the arm 105. The cam 134 engages a roller 134' which is carried by a lever 135 keyed to a shaft 135'. On the opposite end of the shaft 135' is keyed a lever 136 which is provided with two elongated slots that provide adjustment for the two links 137 that are attached to the lever 136 through the medium of clamp screws 137'. The other ends of links 137 are attached to the plungers 132 and 133 through the medium of pin 138 and a block 138'. The ends of the plungers 132 and 133 are slotted to receive pin 138 which is normally held at the rear end of the slots by the action of the compression springs 139. The springs 139 provide a safety in the operation of the escapement unit should some obstruction be in the way of plungers 132 and 133, in which case the springs would be compressed and the pin 139 would move in the slot in the plungers 132 and 133. The lever 136 engages a plunger 140 which is free to slide in the right hand chute 107$^2$. The plunger 140 is backed up with a compression spring 140'. As the leaf 106 and leaf arm 105 swing down the cam 134 forces the lever 135 in a direction to compress spring 140 and withdraws the stop plunger 132 at the same time release plunger 133 is entering the chute.

When the stop plunger is withdrawn the work in the chute slides down against the release plunger 133 as shown clearly in Fig. 41. As the leaf arm swings up the cam 134 starts to run away from the roller 134' and lever 135. The compression spring 140' causes the roller 134' to follow up the cam 134 and withdraw release plunger 133. At the same time stop plunger 132 starts to enter the chute, its end going between two pieces of work as fully illustrated by Fig. 40. The stop plunger 132 stops the work above it from sliding down when the release plunger 133 is fully withdrawn allowing only the one piece of work between the two plungers to slide to the end of the chute as shown in Fig. 41. The stroke of these plungers is controlled by the location of the links 137 in the slots of the lever 136.

*Conveyor mechanism*

In order to place finished work into containers apart from the machine, I have provided means as shown in Figs. 47 to 52 inclusive.

The finished work drops out of the chuck turret D' into the delivery trough 160, the front end of which is supported through the medium of a bracket 161 fastened to the delivery trough 160. The bracket 162 is pivoted to the trough 160 at 161' and at 162' to a partition 163 on the base A. The rear end of the delivery trough 160 is carried through the medium of a bail 164 attached to the trough, a pivot pin 165, and a bell crank 166 which is free to pivot on a shaft 167 pressed into the base A.

A reciprocatory motion to the delivery trough 160 is obtained from the gear 60 in the driving unit H. The gear 60 is provided with a cam path 168 which engages a roller 169 carried on pin 169', pressed into the outer end of the lever 170. The lever 170 is free to pivot on the shaft 171 pressed into the main casting 1. The lever 170 is slotted to receive a screw 172, on which is mounted a sleeve 172' to receive the upper end of the connecting rod 173. The sleeve 172' is made of sufficient length so that when it is clamped to the lever 170 the connecting rod 173 will be free to pivot on the sleeve 172'. A spacing sleeve 173' is pinned to the connecting rod 173, a washer 173² being placed on each end and being normally held against the sleeve by the compression springs 174 and 174' which are mounted on the connecting rod 173. The outer ends of the compression springs 174 and 174' abut against collars 175 which are pinned to the connecting rod 173. The washers 173² engage one end of the bell crank 166.

When the machine is operating the gear 60 rotates continuously. The cam path 168 gives an oscillating motion to the lever 170 which in turn is transmitted by the connecting rod 173 through the compression springs 174 and 174' to the bell crank 166 giving a reciprocatory motion to the delivery trough 160. The forward movement of the trough is interrupted near the end of its stroke by a lug 160' on the trough 160 coming in contact with a stop screw 175. The momentum of the work, together with the sudden stopping of the trough, moves the work forward on the trough. The compression springs 174 and 174' permit the movement of the trough 160 and the bell crank 166 to be interrupted during part or all of the stroke of the connecting rod 173 which also provides a safety to the operating of the trough mechanism.

Another important function of these springs is that when chips interrupt the forward movement of work on the trough and the work collects in the trough, the weight of the work compresses the springs 174 and 174' still further than is caused by the stop screw 175 giving a more severe shock to the trough and causing the work to be dislodged. The slot in the lever 170 provides means of shortening or lengthening the stroke thereby controlling the speed at which the work moves forward in the trough. The trough 160 is perforated to permit the coolant to drain off the work and be returned to the machine through the medium of trough 176 placed under the delivery trough 160.

I prefer also to use a cam having a quick drop, as best shown in Fig. 50, to give a quick forward movement and a sudden stop to the trough, instead of using the stop screw 175, to cause the work to move forward in the trough. It will readily be seen that this device can be so made that delivery of work can be secured at any desired place and still fall within the scope of this invention.

*Operation*

Briefly the operation is as follows:— Power is delivered to the machine through pulley 2 wherein a safety device is placed to limit the power delivered to the machine and through gears 4, 5, 7, 8, 10, 11, 13, and 15, both the threading die head and forming head are driven, gears 4 and 5 being change gears for controlling the speeds of these heads. The speed at which the threading die head and the forming head revolve in relation to each other is fixed by the ratio in size of gears 13 and 15.

Through the two combinations of gears 23, 24, 25, 26 and clutch 57 or gears 59 and 60 and clutch 57, shaft 56 is driven which in turn through worm gearing 56' and 56² drives cam shaft 58. By means of the two combinations of gearing above referred to the cam shaft 58 is driven during a part of a revolution at a speed determined by the speed of the threading die head spindle, and during the remainder of the revolution at an increased speed. The auxiliary cam shaft 85 is driven from shaft 58 by a one to one gear ratio.

The complete cycle of the machine consists of taking the work out of a hopper, placing it in a chute or guideway, taking it out of the chute or guideway and placing it in a chuck or holding device, the pointing of an end of the work, cutting screw threads on it, taking it out of the chuck or holding device either by its own weight or by an ejector and the indexing of the chuck turret. Certain of these operations can be dispensed with such as by placing the work into the chute or guideway by hand if the work is not shaped so that it can be fed from a hopper or by not using the ejector to eject the work from the chuck or holding device and still retain a complete cycle.

A complete cycle of the machine is secured by one revolution of the cam shafts 58 and 85 having secured to or mounted upon them the following:—

A lever 85' for imparting an oscillating movement to the leaf 106 in the hopper C and attached to leaf 106 is a cam 134 for operating the escapement shown in Figs. 38 to 42 inclusive. The attachment of the escapement to the machine is optional. Cam 118 of which cam surface 118' and cam surface 38² of cam 38 in conjunction with springs 120 and 116 operate the mechanism which takes the pieces out of the chute and delivers them into a position to be held by the chuck or holding device during the pointing and threading operations. The cam 86 having cam surface 86³ and the spring 75 controls through lever 93, lever 95, rod 96, bar 77, the opening and closing of the chuck or holding members; cam surface 86² with spring 91³ controls the withdrawal of the indexing locking pin and the repositioning of the same; and arm 86' indexes the chuck turret by means of a Geneva motion.

The cam 38 has a cam groove 38' for operating the forming head slider unit E in its travel. Cam 38 has a cam surface which in conjunction with springs 46 and 47 controls the movement of the threading die head unit G.

A dog wheel 68 carrying dogs 68' and 68² operates the mechanism which controls the two speeds imparted to cam shafts 58 and 85 during one revolution of said shafts 58 and 85.

Cam 118 has cam surfaces represented by 118² and 118³, which in conjunction with spring 156, operates the ejector for ejecting the work from the work holding device. The attachment of the ejector is optional.

The complete cycle is therefore seen to be controlled by cam shafts 58 and 85 and all are synchronized and timed so that their movements occur in timed relation.

Mounted in the worm wheel 56² is a safety device so that in case an excessive load is placed upon any of the units of the cycle controlled by shafts 58 and 85 the load is thrown on the safety device. The safety device is so positioned that when it functions it does not disturb the synchronism of the mechanisms operated.

Upon completion of the operations upon the work it is free to fall out of the holding device or is ejected by the ejector and falls into the bolt container J or if desired a transfer device, as shown in Figs. 47 to 51 inclusive, can be arranged to transfer the completed work away from the machine.

While the word "bolts" has been used in describing the operation of the machine, it is to be understood as in no way limiting the machine to this class of work as the machine has a much broader use than this. And whereas it has been found desirable to use specific language in describing numerous parts it is done only as a matter of convenience and for the sake of clearness and in no sense intended to limit the scope of the claims but to cover all mechanical equivalents.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new and desire to secure by Letters Patent, is:

1. A machine for pointing and threading work comprising a threading head, a pointing head, work holding means, means for indexing the work holding means, means for placing the work in the work holding means, means for driving all the above named means, the means for driving the work indexing means comprising a cam shaft which is controlled during a portion of its revolution by the speed of the threading die head spindle and during the remainder of its revolution independently of the speed of the threading die head spindle, substantially as set forth.

2. In an automatic machine for pointing and threading work having a threading head, a pointing head, and work holding and indexing means, a driving mechanism comprising a main drive shaft, a driven shaft operatively connected to the pointing and threading mechanism, a second driven shaft operatively connected to the indexing mechanism, the said second shaft being driven from the first named driven shaft during a portion of the time and being driven independently of said shaft during the remainder of the time, and means for changing the duration at which the said second driven shaft is driven through and the time in which it is driven independently of the said first named driven shaft, substantially as set forth.

3. A machine for pointing and threading work comprising a threading head, a pointing head, work holding means, means for indexing the work holding means, means for driving the pointing and threading heads, means for operating the work indexing means in variable relation to the pointing head and threading head driving means comprising a pair of parallel driven shafts, a driving shaft parallel to the driven shafts, the driving shaft having means thereon for positively moving the pointing head forward toward and during operation on the work and for positively withdrawing it from the work and having a yielding clutch therein to prevent injury to the indexing means and to the pointing head, substantially as set forth.

4. A machine for pointing and threading work comprising a pointing head, a threading head, work holding means, means for indexing the work holding means, means for moving the threading and pointing heads into and out of work engaging position comprising a shaft having a cam thereon, means connected to the threading head engaging a contour of the cam for moving the threading head out of work engaging position upon rotation of the cam, and means on the pointing head engageable with a contour on the cam for moving the pointing head into and out of operative position upon rotation of the cam and means for changing the speed of the shaft during that portion of its revolution when it is moving the threading and pointing head out of work engaging position to decrease the idle time of the machine, substantially as set forth.

5. A machine for pointing and threading work comprising a threading die head and a pointing head, work holding means, means for indexing the work holding means, means for feeding work to the work holding means and for removing it therefrom, all of said means being operated from a cam shaft during part of its cycle at a speed which is controlled during a portion of its revolution by the speed of the threading die head spindle and during the remainder of its revolution at a different speed independently of the speed of the die head spindle, substantially as set forth.

6. A machine for pointing and threading work comprising a pointing head, a threading head, work holding means, means for indexing the work holding means, a driving shaft, a driven shaft parallel to the driving shaft, the driven shaft forming the driving connection for the work indexing means, means for driving the threading head comprising a spindle, a driving gear loosely mounted on the first named shaft, a driven gear mounted on the said spindle meshing with the said driving gear, and a cam mounted on the first named shaft for controlling movement of the threading head into and out of work engaging position, substantially as set forth.

7. A machine for pointing and threading work comprising a pointing head, a threading head, means for driving them, a work indexing turret having work holding means mounted therein means for placing the work in the work holding means, a cam shaft having a main cam thereon, a roller engageable with said cam, said roller being operatively connected to the threading die head, means driven by said cam shaft for operating the indexing turret, means for driving the said cam shaft, and separate means for driving the pointing and threading heads, and means for speeding up said cam shaft during a portion of its revolution, substantially as set forth.

8. A machine for pointing and threading work comprising a pointing and a threading head, means for driving them at a constant speed, sliders carrying said heads, a cam shaft, a cam thereon for retracting the threading head, the cam having a contour such as will cause a dwell in the threading head at its retracted position, a shaft parallel to the cam shaft, means for driving the last named shaft from the cam shaft, a work indexing turret, means for indexing said turret by the said last named shaft, the indexing being effected during the dwell in the slider which carries the threading head, means for rotating the cam shaft and means for speeding it up during a portion of a revolution to effect a quick indexing to the turret and a quick return of the threading die head, substantially as set forth.

9. A machine for pointing and threading work comprising a threading and a forming head, a main drive shaft, connections between said shaft and the threading and forming heads for driving them at a constant speed, a cam shaft having a cam thereon for retracting the threading and forming heads, a clutch connecting said main drive shaft and said cam shaft, means on said cam shaft for shifting the clutch to cause the cam shaft to be rotated a part of a revolution at one speed and at a different speed during the remaining part of a revolution, substantially as set forth.

10. A machine for pointing and threading work comprising a threading head and a pointing head, a main drive shaft, driving connection between said shaft and said heads to drive them at a constant speed, a cam shaft having cams for retracting the threading and the forming heads, a clutch connecting said main drive shaft and said cam shaft, means on the said cam shaft for shifting the clutch to cause the cam shaft to be driven a part of a revolution at one speed and at an increased speed during the remainder of the revolution, the said increased speed causing the threading and pointing heads to be withdrawn from the work faster than they are driven to the work to decrease idle time of these heads, substantially as set forth.

11. A machine for pointing and threading work comprising threading and pointing heads, a slider, a spindle, said slider having said spindle mounted therein, said spindle having a threading head mounted thereon, the slider being mounted so as to provide an overhang of the threading head without distortion to the bearings in which the said spindle is mounted and a cam for moving said sliders, said cam being driven a portion of a revolution at one speed and at a faster speed during the remainder of a revolution, the fast speed occurring at the time the heads are being retracted to cut down the idle time of the machine, substantially as set forth.

12. A machine for pointing and threading work comprising a threading head, a pointing head, means for driving the said heads at a constant speed, a cam shaft, a cam on said shaft, an indexing turret having work holding means thereon, operative connection between said cam shaft and the said turret for driving the turret from the said shaft, said operative connection including means for rotating the turret intermittently, and means for rotating the said cam shaft at one speed during a portion of a revolution controlled by the speed of the said threading head and at an increased speed during the remainder of a revolution controlled independently of the speed of said threading head and operated at a different speed, the turret being operated while the cam shaft is rotated at its increased speed, substantially as set forth.

13. A machine for pointing and threading work, comprising a threading die head, a pointing head, a work holding means, means for rotatably supporting the work holding means, means for opening the work holding means, means for indexing the work holding means, a container for holding the work, a chute, means for transferring the work from the container to the chute, and means for transferring the work from the chute to the work holding means, the top surface of the chute located at an angle to the horizontal line, the said threading die head and said pointing head operating at right angles with the top of said chute, the workholding means being positioned at an angle to correspond to the angular position of the chute and located below the pointing the threading heads whereby the work which has been threaded and cuttings from the work may fall freely by gravity, substantially as set forth.

14. A machine for pointing and threading work, comprising a base, a threading head, a pointing head, work holding means, means for rotatably supporting the work-holding means, means for indexing the work holding means, means for operating said locking means for locking the work holding means, means for operating the work holding means, indexing said means for operating said locking means, locking and lock operating means being mounted within a housing and slidable as a single unit on the said base, substantially as set forth.

15. In a bolt pointing and threading machine, a hopper mechanism, work holding means, means for indexing the work holding means, means for rotatably supporting the workholding means, a feeding chute set at an angle to the horizontal to receive the work from said hopper, a threading die head and a pointing head arranged to move at a right angle to the path of the work in said feeding chute, means for operating said heads comprising a cam shaft having cams therein to move the threading and pointing heads, a safety device secured to said cam shaft to limit the power delivered to said cam shaft, the workholding means being positioned at an angle to correspond to the angular position of the chute and located below the pointing and threading heads whereby the work which has been threaded and cuttings from the work may fall freely by gravity, substantially as set forth.

16. In a pointing and threading machine, a threading die head, a pointing head, hopper mechanism, work holding means, means to transfer the work from the hopper mechanism to the work holding means, means for indexing the work holding means, means for driving the work indexing means comprising a cam shaft that is controlled during a portion of its revolution by the speed of the threading die head spindle and during the remainder of its revolution independent of the speed of the threading die head spindle, a safety device secured to said cam shaft to limit the power delivered to said cam shaft, substantially as set forth.

17. A machine of the kind described comprising in combination a threading and pointing element, a work holding and a work indexing unit, separate driving means for said threading and pointing unit and for said indexing means, the threading and pointing unit and the indexing unit being driven at a fixed ratio during a portion of the working cycle, and means for automatically changing the ratio during the remainder of the working cycle, substantially as set forth.

18. A machine for pointing and threading work comprising a threading head, a pointing head, work holding means, means for rotatably supporting the work holding means, means for indexing the work holding means, means for operating the indexing means comprising a driven shaft, a member keyed to said driven shaft, a star or Geneva wheel engaged by the said member and engageable with the supporting means for said workholding means to impart intermittent rotation thereto, said workholding, indexing, and indexing operating means being adjustable as a single unit axially with relation to said driven shaft, substantially as set forth.

In witness whereof, I have hereunto set my hand at Waynesboro, Pa., this eighteenth day of November, A. D. nineteen hundred and twenty-seven.

SAMUEL W. MATHIAS.